US012566390B2

(12) United States Patent
Itabashi et al.

(10) Patent No.: US 12,566,390 B2
(45) Date of Patent: Mar. 3, 2026

(54) CARTRIDGE HAVING DETACHABLE CAP TO COVER OPENING OF CASING FOR REPLENISHING TONER INTO STORAGE BAG ACCOMMODATED IN CASING

(71) Applicant: BROTHER KOGYO KABUSHIKI KAISHA, Nagoya (JP)

(72) Inventors: Nao Itabashi, Nagoya (JP); Masahiko Hayakawa, Ama (JP); Sakiho Hayakawa, Toyoake (JP); Hotaka Kakutani, Kiyosu (JP); Shintaro Fukuoka, Nagoya (JP); Haruka Kizu, Nagoya (JP); Yuki Nagashima, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/932,024

(22) Filed: Oct. 30, 2024

(65) Prior Publication Data

US 2025/0123580 A1 Apr. 17, 2025

Related U.S. Application Data

(63) Continuation of application No. 18/452,931, filed on Aug. 21, 2023, now Pat. No. 12,164,245.

(30) Foreign Application Priority Data

Sep. 20, 2022 (JP) ................................ 2022-148780

(51) Int. Cl.
*G03G 15/08* (2006.01)

(52) U.S. Cl.
CPC ..... *G03G 15/0881* (2013.01); *G03G 15/0875* (2013.01)

(58) Field of Classification Search
CPC ................................................ G03G 15/0875
USPC ................................................ 399/106, 111
See application file for complete search history.

(56) References Cited

U.S. PATENT DOCUMENTS 8,548,352 B2 * 10/2013 Tanaka ............... G03G 15/0898 399/106
9,164,475 B2 * 10/2015 Sato ..................... G03G 21/105
10,197,943 B2 2/2019 Okabe

FOREIGN PATENT DOCUMENTS

JP 2000162861 * 6/2000
JP 2014-067002 A 4/2014
WO 2014-038495 A1 3/2014

* cited by examiner

*Primary Examiner* — Hoan H Tran
(74) *Attorney, Agent, or Firm* — Merchant & Gould P.C.

(57) ABSTRACT

A cartridge includes: a casing having a first opening; a storage bag accommodated in the casing and having a second opening; a seal for closing the second opening; a shaft rotatable; and a cap for closing the first opening. Toner is configured to be replenished through the first opening. Toner stored in the storage bag is configured to be discharged into the casing through the second opening. The shaft is rotatable about a first axis extending in a first direction together with the seal such that the seal closing the second opening is peeled off to open the second opening. The cap is attachable to and detachable from the casing.

20 Claims, 20 Drawing Sheets

CARTRIDGE HAVING DETACHABLE CAP TO COVER OPENING OF CASING FOR REPLENISHING TONER INTO STORAGE BAG ACCOMMODATED IN CASING

REFERENCE TO RELATED APPLICATIONS

This application is a continuation of U.S. patent application Ser. No. 18/452,931, filed Aug. 21, 2023, which claims priority from Japanese Patent Application No. 2022-148780 filed on Sep. 20, 2022. The entire content of the priority applications is incorporated herein by reference.

BACKGROUND ART

There has been known a cartridge including a storage bag storing toner therein, a casing accommodating the storage bag, a seal for closing an opening of the storage bag, and an agitator to which the seal is fixed. According to this conventional cartridge, the seal is peeled off the opening as the agitator rotates, thereby allowing the toner stored in the storage bag to be discharged into the casing.

DESCRIPTION

The conventional cartridge is assumed to be disposable. However, in recent years, there has been a demand to make a cartridge recyclable in consideration of the environment. As one of methods for recycling a cartridge including a storage bag, conceivably, the storage bag may be replaced with a new storage bag storing new toner. However, this method inevitably requires a structure that the casing of the cartridge can be disassembled, for example. Since disassembly of the casing needs to be performed in the recycling process, the replacement of the storage bag becomes cumbersome.

In view of the foregoing, it is an object of the present disclosure to provide a technique to realize easy recycling of a cartridge including a casing and a storage bag storing toner therein, without requiring disassembly of the casing.

In order to attain the above and other objects, according to one aspect, the disclosure provides a cartridge including a casing, a storage bag, a seal, a shaft, and a cap. The casing has a first opening for replenishing toner therethrough. The storage bag is configured to store toner therein and accommodated in the casing. The storage bag has a second opening through which the toner stored in the storage bag is configured to be discharged into the casing. The seal is for closing the second opening. The shaft is rotatable about a first axis extending in a first direction. The shaft is rotatable together with the seal such that the seal closing the second opening is peeled off to open the second opening. The cap is configured to close the first opening. The cap is attachable to and detachable from the casing.

With this structure, since the cap for closing the first opening is detachably attachable to the casing, refiling of toner into the casing can be performed simply by detaching the cap from the first opening when the toner in the casing is used up. This construction does not require disassembly of the casing, thereby facilitating recycling of the cartridge.

DETAILED DESCRIPTION

First Embodiment

Next, a cartridge 1 according to a first embodiment of the present disclosure will be described in detail with reference to FIGS. 1 through 10B.

Figure 1:
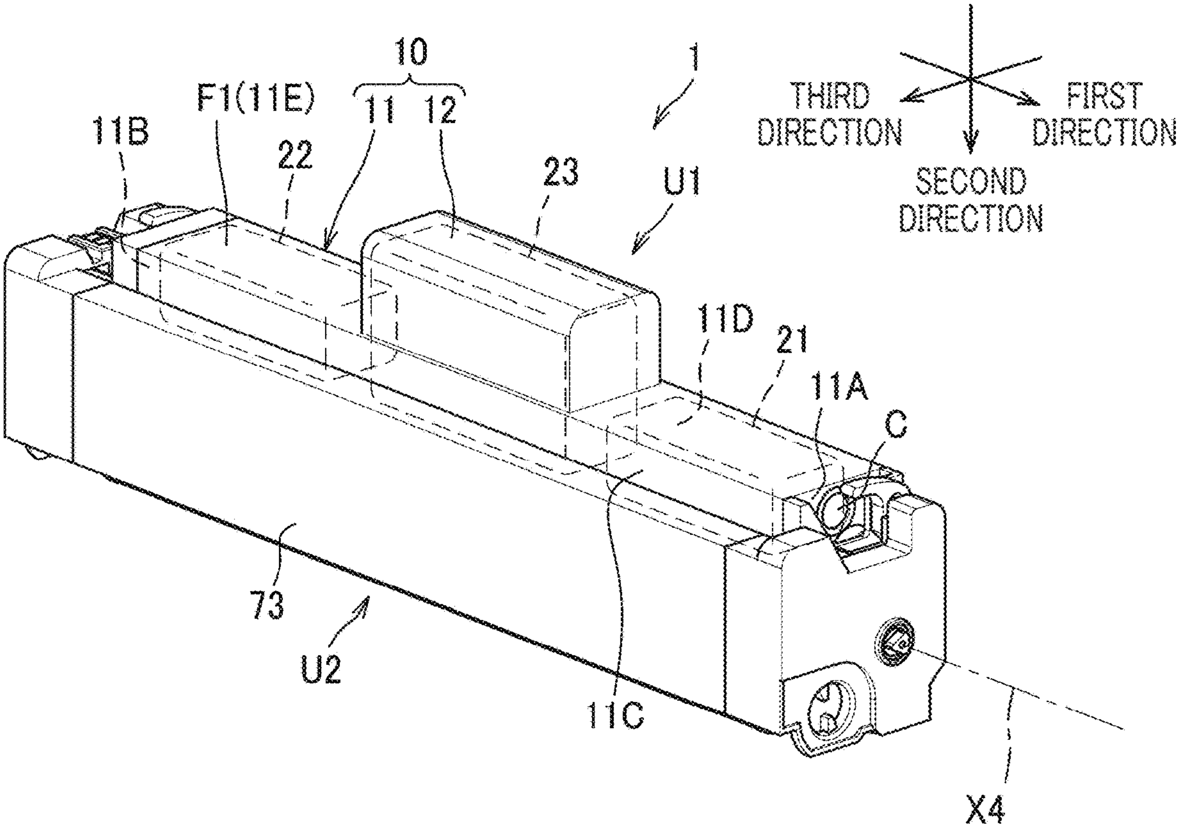
FIG. 1 is a perspective view of a cartridge according to a first embodiment as viewed from one side in a first direction.
Figure 2:
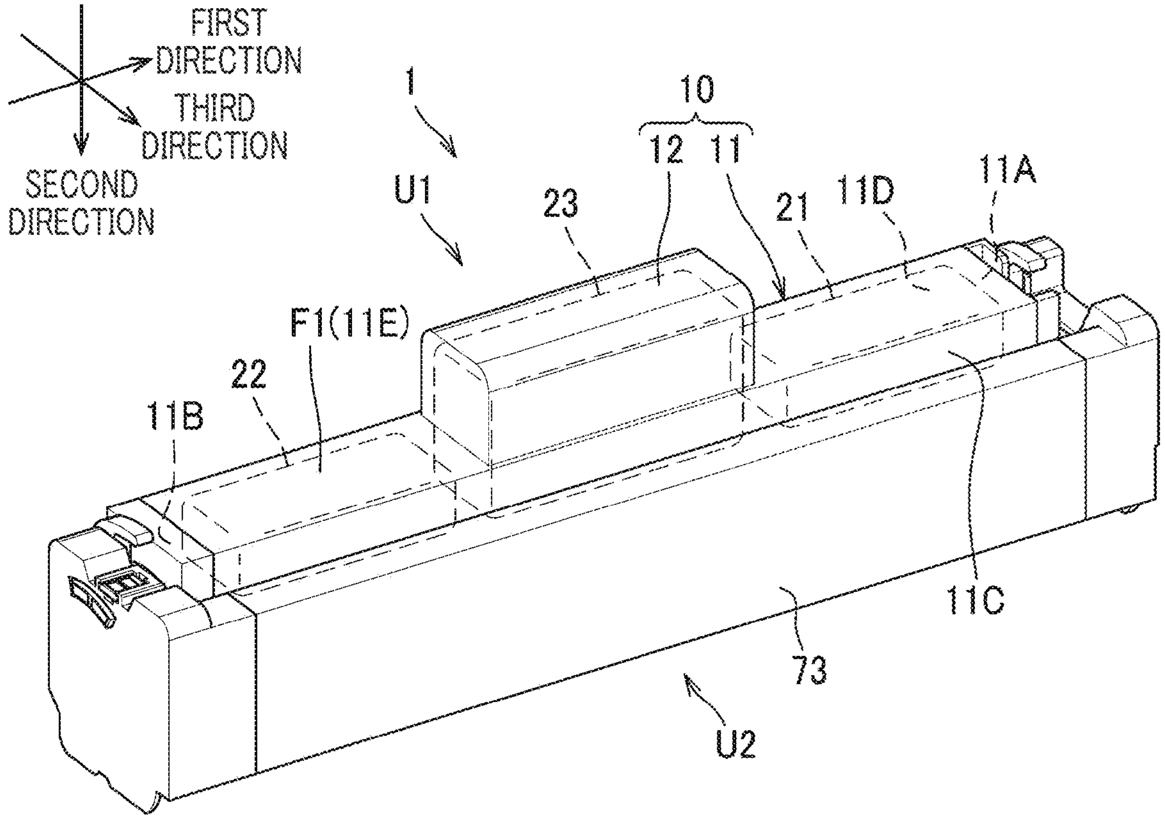
FIG. 2 is a perspective view of the cartridge according to the first embodiment as viewed from another side in the first direction.

As illustrated in FIGS. 1 and 2, the cartridge 1 includes a developing unit U1, and a drum unit U2. The developing unit U1 is pivotally movable, relative to the drum unit U2, about a fourth axis X4 extending in a first direction.

In the following description, directions will be based on directions indicated in FIG. 1. In the present embodiment, a second direction is orthogonal to the first direction, and a third direction is orthogonal to both the first direction and the second direction. Incidentally, the second direction may be any direction as long as the second direction crosses the first direction, and the third direction may be any direction as long as the third direction crosses both the first and second directions.

Further, each arrow in the drawings indicates one side in the corresponding direction (the first to third directions). In the following description, “one end” or “one end portion” implies a component at the one side in the corresponding direction (a leading side of the arrow), and “another end” or “another end portion” implies a component at another side in the corresponding direction (a trailing side of the arrow).

The developing unit U1 includes a casing 10, a first storage bag 21, a second storage bag 22, a third storage bag 23, and a cap C. The casing 10 and the cap C are made of, for example, electrically non-conductive resin. The first, second, and third storage bags 21, 22, and 23 are formed of, for example, a flexible sheet.

The casing 10 includes a casing body 11, and a handle 12.

The casing body 11 has a first side wall 11A, a second side wall 11B, a third side wall 11C, a fourth side wall 11D, and a wall 11E.

Figure 6:
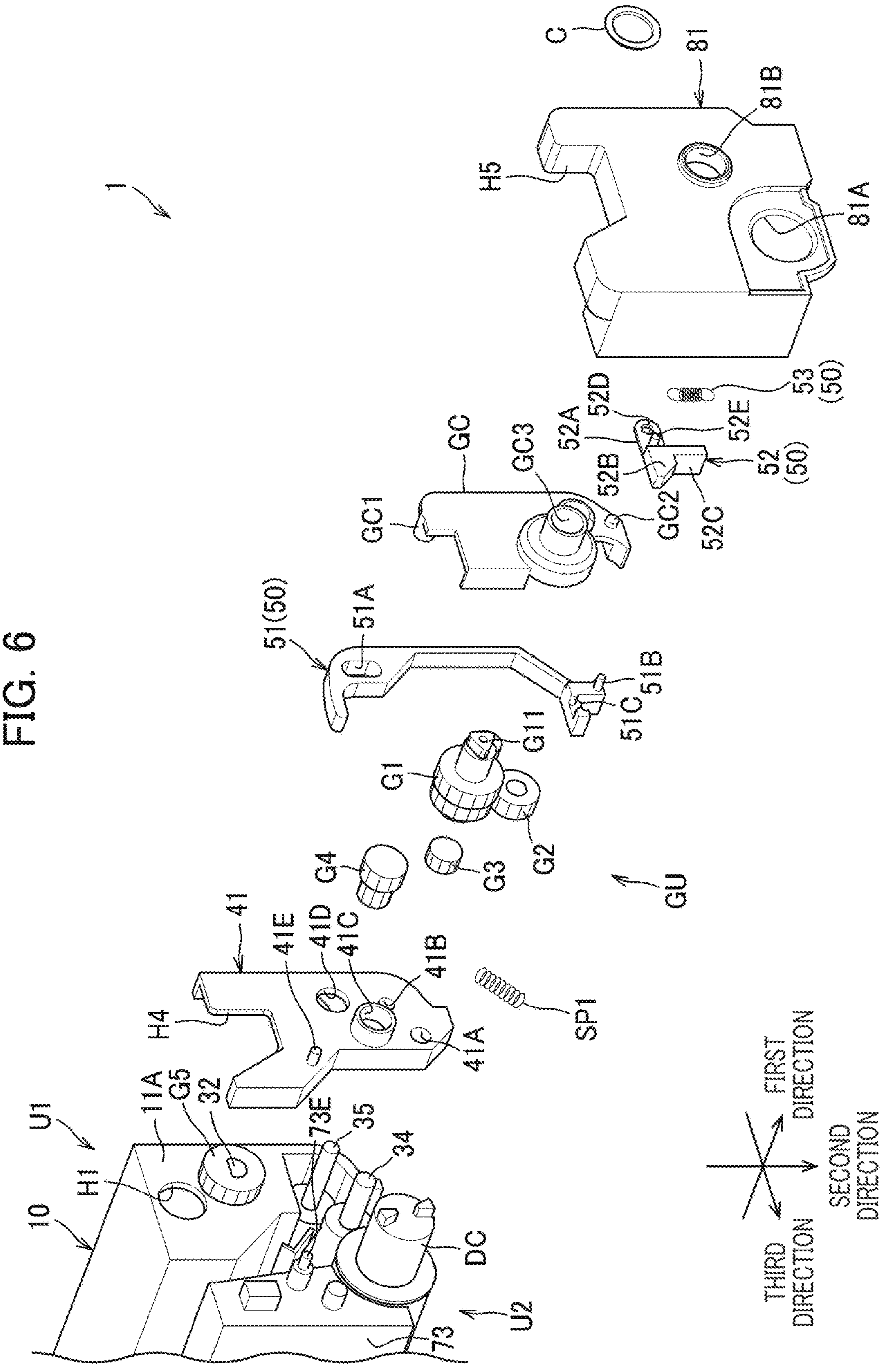
FIG. 6 is an exploded perspective view illustrating a structure of one end portion in the first direction of the cartridge according to the first embodiment.

The first side wall 11A constitutes one end of the casing body 11 in the first direction. In other words, the first side wall 11A is positioned at one end portion of a shaft 32 (FIG. 3A, described later) in the first direction. As illustrated in FIG. 6, the first side wall 11A has a first opening H1. The first opening H1 is configured to allow toner to pass therethrough to replenish toner into the casing 10. The first opening H1 is positioned at another end portion of the first side wall 11A in the second direction.

The cap C is configured to block the first opening H1. The cap C is detachably attachable to the casing 10. In the present embodiment, the cap C is fitted with the first opening H1.

As illustrated in FIG. 1, the second side wall 11B constitutes another end of the casing body 11 in the first direction. In other words, the second side wall 11B is positioned at another end portion of the shaft 32 (described later) in the first direction.

The third side wall 11C constitutes one end of the casing body 11 in the third direction. The third side wall 11C connects the first side wall 11A to the second side wall 11B. The third side wall 11C faces a drum housing 73 (FIG. 3A, described later) in the third direction.

Figure 3A:
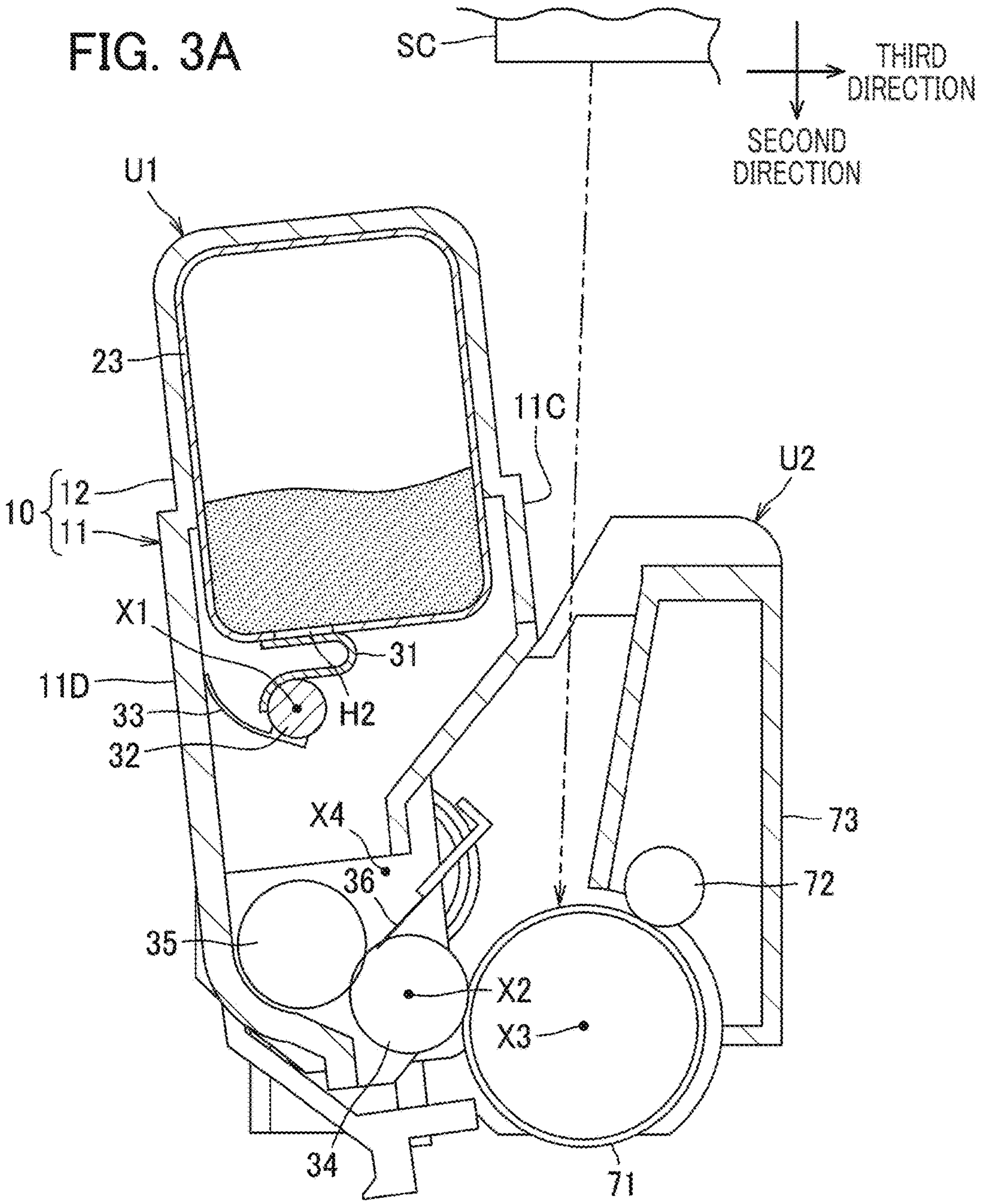
FIG. 3A is a cross-sectional view of the cartridge according to the first embodiment when a developing roller is at a first position.

The fourth side wall 11D constitutes another end of the casing body 11 in the third direction. The fourth side wall 11D connects the first side wall 11A to the second side wall 11B. As illustrated in FIG. 3A, the fourth side wall 11D is positioned opposite the third side wall 11C with respect to the shaft 32 (described later).

As illustrated in FIG. 1, the wall 11E constitutes another end of the casing body 11 in the second direction. The wall 11E is connected to the first side wall 11A, the second side wall 11B, the third side wall 11C, and the fourth side wall 11D. The wall 11E has a first surface F1. The first surface F1 is a part of an outer surface of the casing body 11.

The handle 12 protrudes from the first surface F1. The handle 12 is positioned at another end of the casing 10 in the second direction. The handle 12 has an internal space in communication with an internal space of the casing body 11.

The first storage bag 21, the second storage bag 22, and the third storage bag 23 respectively store toner therein. The first storage bag 21, the second storage bag 22, and the third storage bag 23 are accommodated in the casing 10.

Specifically, the first storage bag 21 and the second storage bag 22 are accommodated inside the casing body 11. The handle 12 is positioned between the first storage bag 21 and the second storage bag 22 in the first direction.

The third storage bag 23 has a part accommodated in the casing body 11, and a remaining part accommodated in the handle 12. The third storage bag 23 has a length in the second direction that is longer than a length in the second direction of each of the first and second storage bags 21 and 22. The third storage bag 23 is positioned between the first storage bag 21 and the second storage bag 22 in the first direction.

As illustrated in FIG. 3A, the third storage bag 23 has a second opening H2 configured to discharge the toner therethrough into the casing 10.

Figure 5:
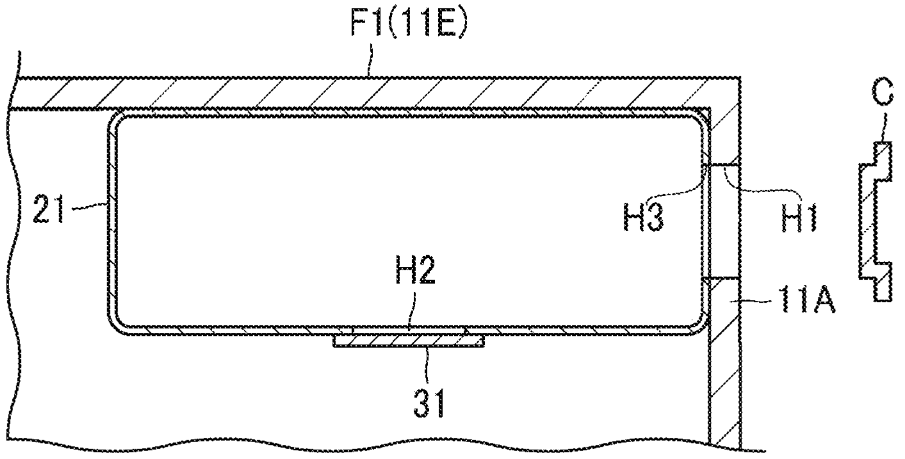
FIG. 5 is a partially enlarged cross-sectional view of a structure near a first storage bag in the cartridge according to the first embodiment.

As illustrated in FIG. 5, the first storage bag 21 has a second opening H2 for discharging the toner into the casing 10. Although not illustrated, the second storage bag 22 also has a second opening H2 for discharging the toner into the casing 10.

The first storage bag 21 further has a third opening H3 for allowing the toner to pass therethrough for filling the first storage bag 21 with toner from an outside thereof. The third opening H3 is formed at such a position where toner can be replenished into the first storage bag 21 through the first opening H1 and the third opening H3.

In the present embodiment, the third opening H3 faces the first opening H1. In other words, a portion of the first storage bag 21 around the third opening H3 is in contact with a portion of the first side wall 11A around the first opening H1.

As illustrated in FIG. 3A, the developing unit U1 further includes a seal 31, the shaft 32, a sheet 33, a developing roller 34, a supply roller 35, and a layer thickness-regulating blade 36.

The seal 31 is formed of, for example, a flexible sheet. Specifically, the seal 31 may be configured as an adhesive tape having one surface coated with an adhesive agent.

The seal 31 has one end portion adhered to or fuse-bonded to the third storage bag 23 so as to block the second opening H2. The seal 31 has another end portion adhered to the shaft 32 through, for example, an adhesive agent. Although not illustrated, the seal 31 also blocks the respective second openings H2 of the first storage bag 21 and the second storage bag 22.

The seal 31 may be plural or singular in number. Specifically, the seal 31 may be plural in number such that one seal 31 may be provided for each of the storage bags 21, 22, 23. Alternatively, a single seal 31 may be provided to cover all of the second openings H2 of the storage bags 21, 22 and 23.

Figure 3B:
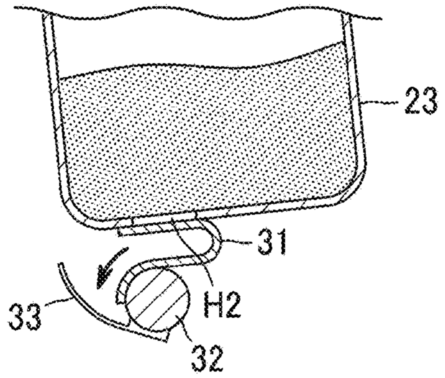
FIG. 3B is a cross-sectional view schematically describing how a seal is peeled off a second opening by a rotation of a shaft in the cartridge according to the first embodiment, and particularly illustrating a state where the seal closes the second opening.
Figure 3C:
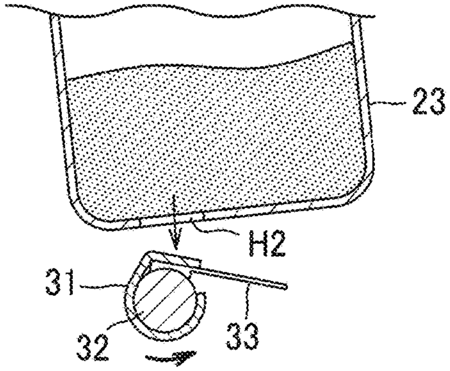
FIG. 3C is a cross-sectional view schematically describing how the seal is peeled off the second opening by the rotation of the shaft in the cartridge according to the first embodiment and particularly illustrating a state where the seal opens the second opening.

The shaft 32 is rotatable, together with the seal 31, about the first axis X1 extending in the first direction. As illustrated in FIGS. 3B and 3C, the shaft 32 is rotatable to wind the seal 31 from a state where the seal 31 blocks the second openings H2 to a state where the seal 31 opens the second openings H2. Once the second openings H2 are opened, the toner in each of the storage bags 21, 22, 23 is discharged into the casing 10 through the corresponding second openings H2.

The sheet 33 is attached to the shaft 32. The sheet 33 is rotatable within the casing 10. As the sheet 33 rotates, the sheet 33 agitates the toner accommodated in the casing 10. That is, a combination of the sheet 33 and the shaft 32 functions as an agitator for agitating the toner.

The developing roller 34 is configured to supply toner to a photosensitive drum 71 (described later). The developing roller 34 is rotatable about a second axis X2 extending in the first direction. The developing roller 34 is positioned at one end portion of the casing 10 in the second direction. The developing roller 34 is supported by the casing 10.

The supply roller 35 is configured to supply toner to the developing roller 34. The layer thickness-regulating blade 36 is configured to regulate a thickness of a toner layer formed on the developing roller 34.

The drum unit U2 includes the photosensitive drum 71, a charging roller 72, and the drum housing 73.

The photosensitive drum 71 is rotatable about a third axis X3 extending in the first direction. The charging roller 72 is configured to charge the photosensitive drum 71. The photosensitive drum 71 charged by the charging roller 72 is exposed to light irradiated from an exposure unit SC provided in an image forming apparatus.

The drum housing 73 accommodates a part of the charge roller 72. The drum housing 73 faces the casing body 11 in the third direction.

Figure 4:
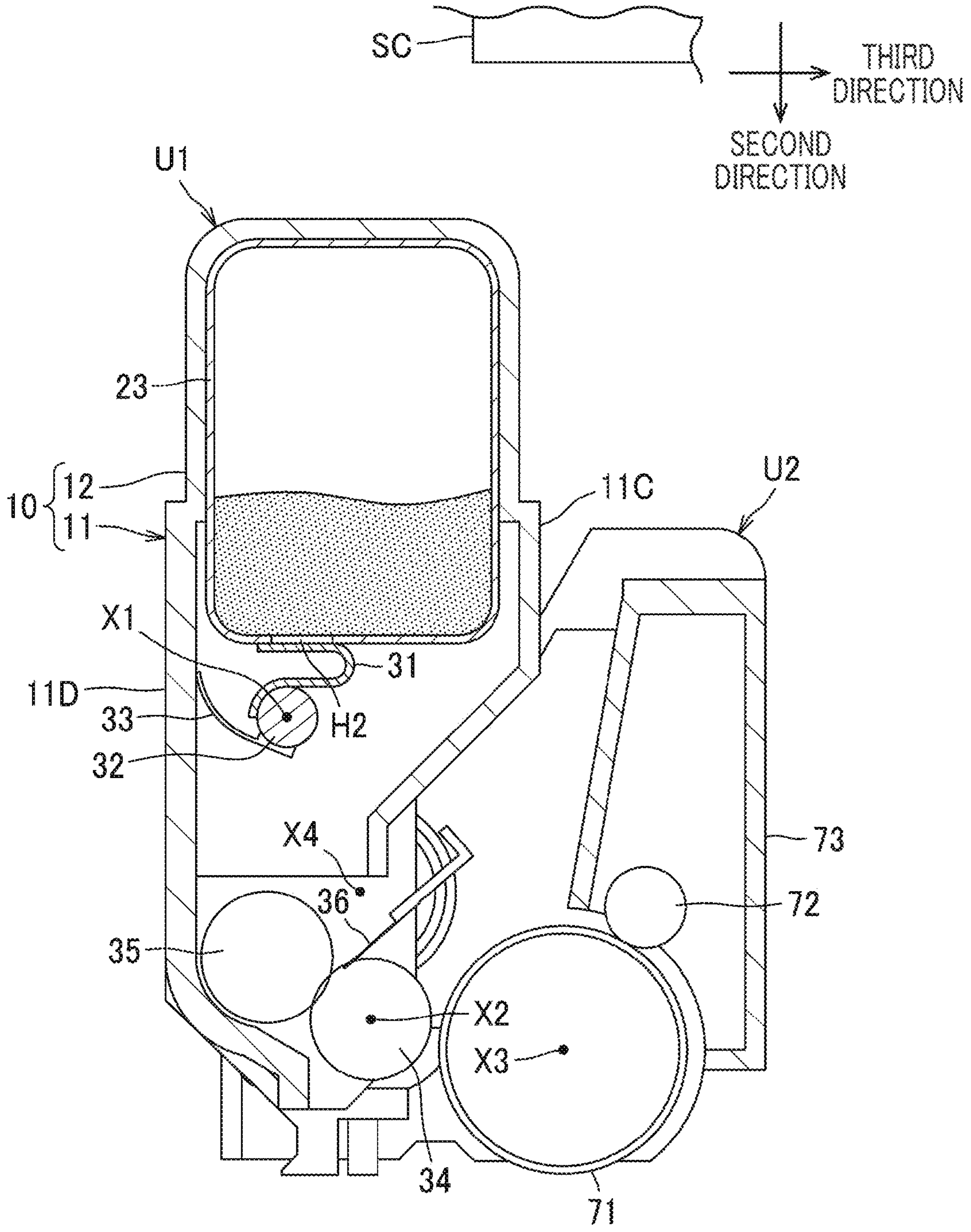
FIG. 4 is a cross-sectional view of the cartridge according to the first embodiment when the developing roller is at a second position.

The developing roller 34 is pivotally movable about the fourth axis X4 between a first position illustrated in FIG. 3A and a second position illustrated in FIG. 4. The developing roller 34 contacts the photosensitive drum 71 at the first position, and the developing roller 34 is separated from the photosensitive drum 71 at the second position.

As illustrated in FIG. 6, the developing unit U1 further includes a first bearing 41, a compression coil spring SP1, a gear unit GU, a gear cover GC, and a separation mechanism 50. The first bearing 41, the compression coil spring SP1, the gear unit GU, the gear cover GC, and the separation mechanism 50 are positioned at one end of the developing unit U1 in the first direction.

The first bearing 41, the gear unit GU, and the gear cover GC are made of, for example, electrically non-conductive resin. The compression coil spring SP1 is made of, for example, metal.

The first bearing 41 has a first hole 41A, a second hole 41B, a third hole 41C, a fourth hole 41D, a protrusion 41E, and a fourth opening H4. The first bearing 41 is attached to the first side wall 11A of the casing body 11.

The first hole 41A rotatably supports one end portion of the developing roller 34 in the first direction. The one end portion of the developing roller 34 extends throughout the first hole 41A.

The second hole 41B rotatably supports one end portion of the supply roller 35 in the first direction. The one end portion of the supply roller 35 extends throughout the second hole 41B.

The third hole 41C rotatably supports a coupling gear G1 (described later). The fourth hole 41D rotatably supports an idle gear G4 (described later).

The fourth opening H4 allows the first opening H1 to be exposed to an outside. The fourth opening H4 is a recess that is recessed in the second direction toward one side from another end of the first bearing 41 in the second direction. The fourth opening H4 penetrates through the first bearing 41 in the first direction and is open toward the other side in the second direction.

The compression coil spring SP1 urges the developing roller 34 toward the photosensitive drum 71. The compression coil spring SP1 is positioned between the developing unit U1 and the drum unit U2. Specifically, the drum housing 73 includes a protrusion 73E. The compression coil spring SP1 is interposed between the protrusion 41E of the first bearing 41 and the protrusion 73E of the drum housing 73.

The gear unit GU includes the coupling gear G1, a developing gear G2, a supply gear G3, the idle gear G4, and an agitator gear G5.

The coupling gear G1 includes a coupling portion G11. The coupling portion G11 is configured to receive a driving force from a drive source (not shown) provided in a main housing of the image forming apparatus. The coupling gear G1 is in meshing engagement with the developing gear G2, the supply gear G3, and the idle gear G4.

The developing gear G2 is attached to the one end portion of the developing roller 34 in the first direction. The developing gear G2 is rotatable together with the developing roller 34.

The supply gear G3 is attached to the one end portion of the supply roller 35 in the first direction. The supply gear G3 is rotatable together with the supply roller 35. The coupling gear G1, the developing gear G2, and the supply gear G3 are positioned opposite the casing 10 with respect to the first bearing 41 in the first direction.

The agitator gear G5 is attached to the one end portion of the shaft 32 in the first direction. The agitator gear G5 is rotatable together with the shaft 32. The agitator gear G5 is positioned between the first side wall 11A and the first bearing 41 in the first direction.

The idle gear G4 includes a large diameter portion and a small diameter portion. The small diameter portion has a diameter smaller than a diameter of the large diameter portion. The large diameter portion constitutes one end portion of the idle gear G4 in first direction, and the small diameter portion constitutes another end portion of the idle gear G4 in the first direction. The small diameter portion of the idle gear G4 extends through the fourth hole 41D. The large diameter portion of the idle gear G4 is positioned on the one side of the first bearing 11A in the first direction, and the small diameter portion of the idle gear G4 is positioned on the other side of the first side wall 11A in the first direction. In other words, the large diameter portion is positioned farther from the first side wall 11A than the first bearing 41 is from the first side wall 11A in the first direction, and the small diameter portion of the idle gear G4 is positioned closer to the first side wall 11A than the first bearing 41 is to the first side wall 11A in the first direction. The large diameter portion of the idle gear G4 is in meshing engagement with the coupling gear G1. The small diameter portion of the idle gear G4 is in meshing engagement with the agitator gear G5.

The gear cover GC covers the coupling gear G1, the developing gear G2, the supply gear G3, and the idle gear G4. The gear cover GC is attached to the first bearing 41. The gear cover GC includes a protrusion GC1 and a protrusion GC2, and has a hole GC3.

The protrusion GC1 supports a lever 51 (described later) of the separation mechanism 50. The protrusion GC1 protrudes in the first direction toward the other side, i.e., toward the first bearing 41.

The protrusion GC2 supports a locking member 52 (described later) of the separation mechanism 50. The protrusion GC2 protrudes in the first direction toward the one side, i.e., in a direction away from the first bearing 41 in the first direction.

Figure 7:
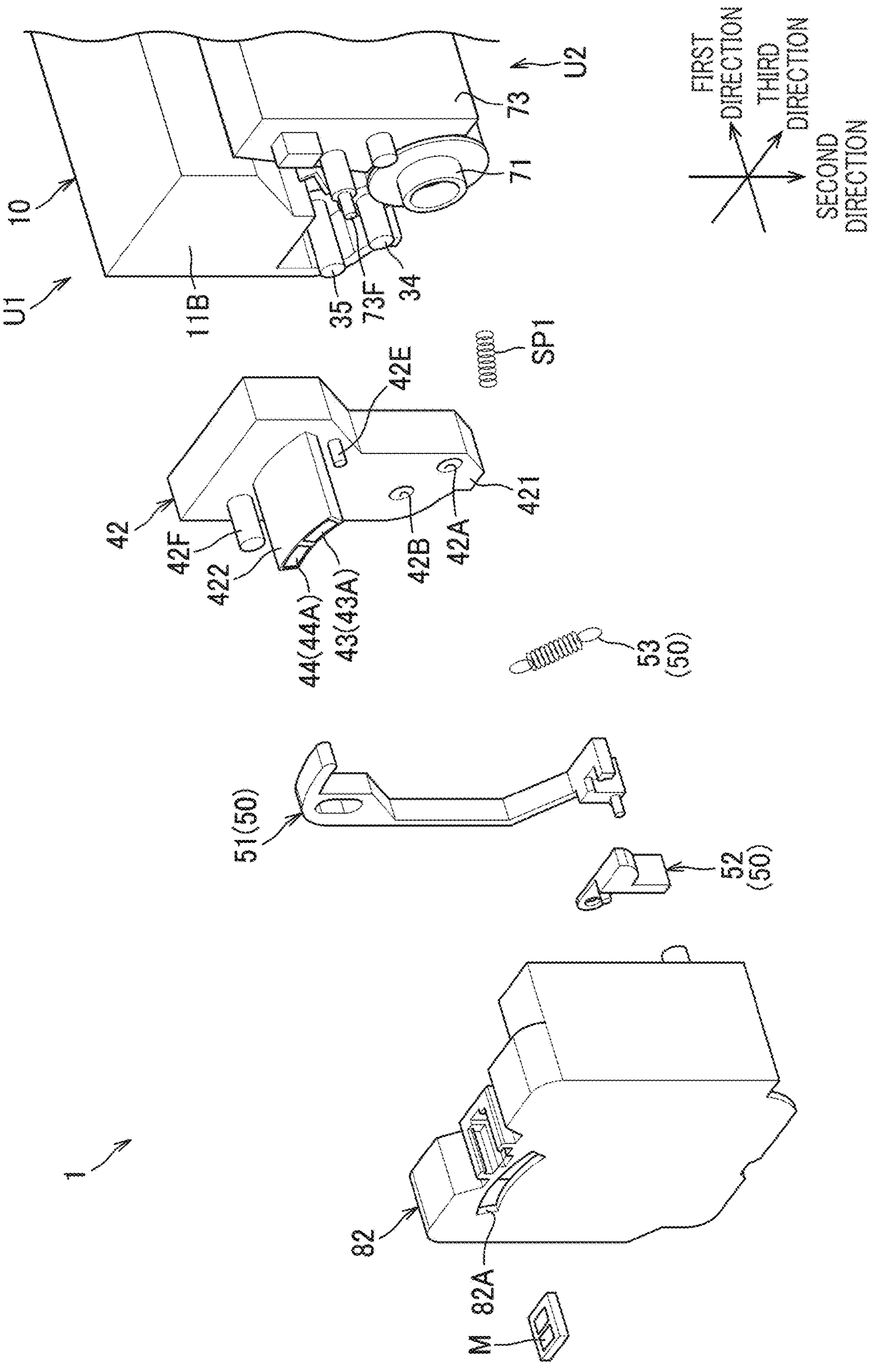
FIG. 7 is an exploded perspective view illustrating a structure of another end portion in the first direction of the cartridge according to the first embodiment.

The separation mechanism 50 is configured to move the developing roller 34 between the first position and the second position. As illustrated in FIGS. 6 and 7, the separation mechanisms 50 is provided at each end of the cartridge 1 in the first direction. Details of the separation mechanism 50 will be described later.

As illustrated in FIG. 6, the drum unit U2 further includes a drum coupling DC and a first side cover 81.

The drum coupling DC is attached to one end portion of the photosensitive drum 71 in the first direction. The drum coupling DC is rotatable together with the photosensitive drum 71. The drum coupling DC is configured to receive the driving force from the driving source provided in the main housing of the image forming apparatus.

The first side cover 81 is attached to the developing unit U1 and the drum housing 73. The first side cover 81 covers the developing unit U1 and the drum housing 73 from the one side thereof in the first direction. The first side cover 81 has a hole 81A, a hole 81B, and a fifth opening H5.

The hole 81A enables the drum coupling DC to be exposed to the outside. The hole 81B enables the coupling portion G11 of the coupling gear G1 to be exposed to the outside.

The fifth opening H5 allows the first opening H1 to be exposed to the outside. The fifth opening H5 is a recess that is recessed in the second direction toward the one side from another end of the first side cover 81 in the second direction. The fifth opening H5 penetrates through the first side cover 81 in the first direction, and is open toward the other side in the second direction.

Figure 8:
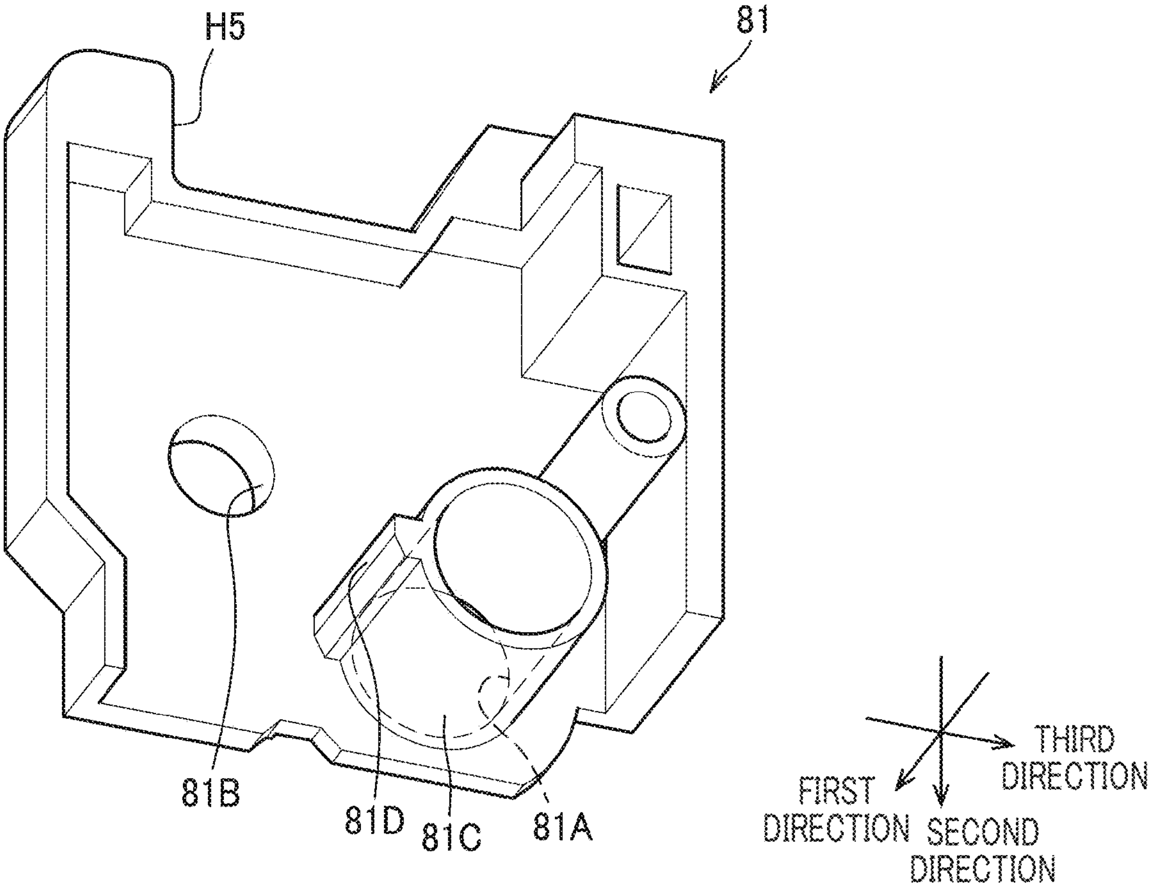
FIG. 8 is a perspective view of a first side cover of the cartridge according to the first embodiment as viewed from the other side in the first direction.

As illustrated in FIG. 8, the first side cover 81 further includes a sleeve part 81C, and a protrusion 81D.

The sleeve part 81C rotatably supports the drum coupling DC. The sleeve part 81C extends from a peripheral portion of the hole 81A in the first direction toward the other side, i.e., toward the first surface F1 of the casing 10 in the first direction.

The protrusion 81D protrudes from an outer circumferential surface of the sleeve part 81C. The protrusion 81D is configured to contact the locking member 52 of the corresponding separation mechanism 50. The locking member 52 will be described later.

As illustrated in FIG. 7, the developing unit U1 further includes a second bearing 42, a developing electrode 43, a supply electrode 44, the separation mechanism 50, and the compression coil spring SP1. The second bearing 42, the developing electrode 43, the supply electrode 44, and the separation mechanism 50 are positioned at another end portion of the developing unit U1 in the first direction.

The second bearing 42 is made of, for example, electrically non-conductive resin. The developing electrode 43 and the supply electrode 44 are made of, for example, electrically conductive resin. The compression coil spring SP1 is made of metal, for example.

Incidentally, the second bearing 42 may be made of an electrically conductive resin or metal. In this case, the second bearing 42 may be electrically connected to the developing roller 34 and the supply roller 35. Further, the developing electrode 43 and the supply electrode 44 may be electrically connected to the developing roller 34 and the supply roller 35 through the second bearing 42. Still further, the developing electrode 43 and the supply electrode 44 may be made of metal.

The developing electrode 43 is configured to apply a voltage to the developing roller 34. The developing electrode 43 is electrically connected to the developing roller 34.

The developing electrode 43 has a contact surface 43A. The contact surface 43A is configured to contact a first body electrode attached to the main housing of the image forming apparatus. The developing electrode 43 has a remaining portion that extends from the contact surface 43A in the first direction toward the one side, and that then extends, along a side surface of the second bearing 42 at the one side in the first direction, toward another end of the developing roller 34 in the first direction to contact the same. The contact of the developing electrode 43 with the other end in the first direction of the developing roller 34 enables the voltage to be applied to the developing roller 34 from the developing electrode 43.

The supply electrode 44 is configured to apply a voltage to the supply roller 35. The supply electrode 44 is electrically connected to the supply roller 35.

The supply electrode 44 has a contact surface 44A. The contact surface 44A is configured to contact a second body electrode attached to the main housing of the image forming apparatus. The supply electrode 44 has a remaining portion that extends from the contact surface 44A in the first direction toward the one side, and that then extends, along the side surface of the second bearing 42 at the one side in the first direction, toward another end of the supply roller 35 in the first direction to contact the same. The contact of the supply electrode 44 with the other end in the first direction of the supply roller 35 enables a voltage to be applied to the supply roller 35 from the supply electrode 44.

The second bearing 42 includes a first portion 421 and a second portion 422. The second bearing 42 is attached to the second side wall 11B of the casing body 11.

The first portion 421 covers the second side wall 11B. The first portion 421 supports a part of the developing electrode 43 and a part of the supply electrode 44. The first portion 421 has a first hole 42A, a second hole 42B, a protrusion 42E, and a protrusion 42F.

The first hole 42A rotatably supports another end portion of the developing roller 34 in the first direction. The other end portion in the first direction of the developing roller 34 extends through the first hole 42A.

The second hole 42B rotatably supports another end portion of the supply roller 35 in the first direction. The other end portion in the first direction of the supply roller 35 extends through the second hole 42B.

The protrusion 42E supports the compression coil spring SP1. The drum housing 73 includes a protrusion 73F. The compression coil spring SP1 is interposed between the protrusion 42E of the second bearing 42 and the protrusion 73F of the drum housing 73. The protrusion 42F supports the lever 51 of the corresponding separation mechanism 50. The protrusion 42F extends in the first direction toward the other side, i.e., in a direction away from the second side wall 11B in the first direction.

The second portion 422 protrudes from the first portion 421 in the first direction toward the other side. The second portion 422 has an arcuate shape centered on the fourth axis X4 which is the pivot axis of the developing unit U1. The second portion 422 supports portions of the developing electrode 43 and the supply electrode 44, the portions being not supported by the first portion 421.

Incidentally, the developing electrode 43 and the supply electrode 44 may be separate members from the second bearing 42, or may be integrally formed with the second bearing 42. Further, the developing electrode 43 may be a separate member from the supply electrode 44, or may be integrally formed with the supply electrode 44.

The drum unit U2 further includes a memory M, and a second side cover 82.

The memory M stores information about at least one of the developing unit U1 and the drum unit U2. The memory M is attached to the second side cover 82. The memory M is positioned at another end of the second side cover 82 in the second direction.

The second side cover 82 is attached to the developing unit U1 and the drum housing 73. The second side cover 82 covers the developing unit U1 and the drum housing 73 from the other side thereof in the first direction. The second side cover 82 rotatably supports the photosensitive drum 71. The second side cover 82 has a slot 82A.

The slot 82A is a through-hole that allows the developing electrode 43 and the supply electrode 44 to be exposed to the outside. The slot 82A has an arcuate shape centered on the fourth axis X4. The second portion 422 of the second bearing 42 is inserted in the arcuate slot 82A to extend therethrough. The slot 82A supports the second portion 422 of the second bearing 42 such that the second portion 422 is movable relative to the slot 82A along an arcuate locus thereof centered on the fourth axis X4.

Although not illustrated in the drawings, the second side cover 82 also includes a sleeve part and a protrusion corresponding to the sleeve part 81C and the protrusion 81D of the first side cover 81, respectively.

Next, the separation mechanism 50 will be described. The structure of the separation mechanism 50 provided at one end in the first direction of the cartridge 1 is substantially the same as that at the other end in the first direction of the cartridge 1. Therefore, hereinafter, the separation mechanism 50 at the one end in the first direction of the cartridge 1 will only be described in detail as a matter of convenience.

As illustrated in FIG. 6, the separation mechanism 50 includes the lever 51, the locking member 52, and a tension coil spring 53. The lever 51 and the locking member 52 are made of, for example, electrically non-conductive resin. The tension coil spring 53 is made of metal, for example.

The lever 51 is configured to move the developing roller 34 between the first position and the second position. The lever 51 has an elongated shape extending in the second direction. The lever 51 has an elongated hole 51A, a protrusion 51B, and a recess 51C.

The elongated hole 51A is elongated in the second direction. The protrusion 51B and the recess 51C are positioned at one end portion of the lever 51 in the second direction. The elongated hole 51A is positioned at another end portion of the lever 51 in the second direction.

The protrusion GC1 of the gear cover GC is received in the elongated hole 51A. The protrusion GC1 supports the lever 51 such that the lever 51 is movable in the second direction as well as the lever 51 is pivotable.

Figure 9C:
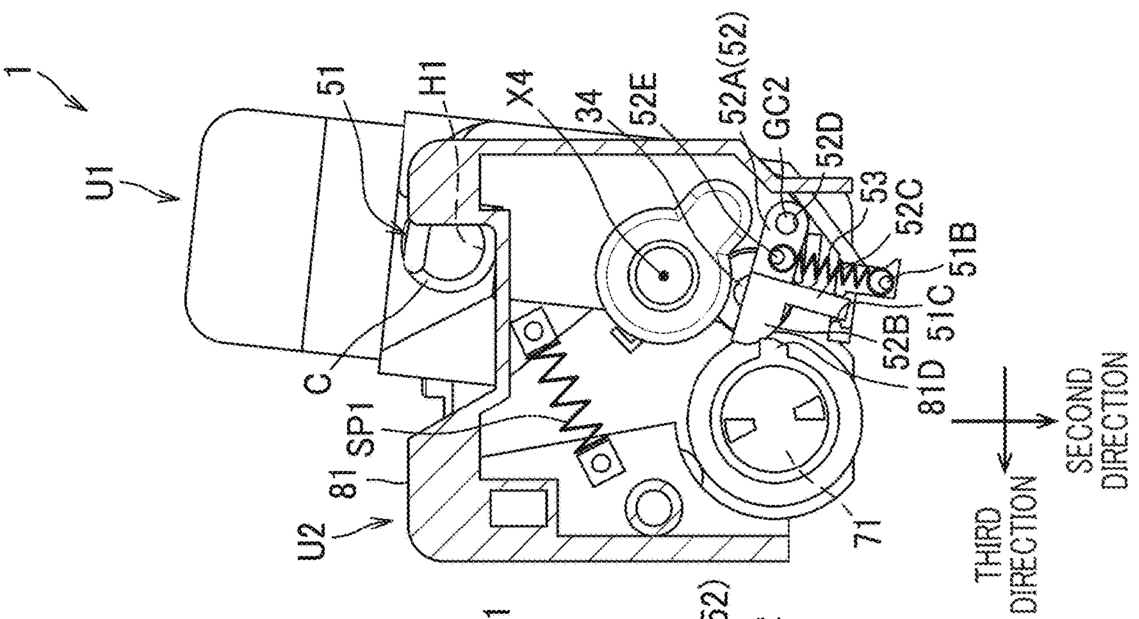
FIG. 9C is a cross-sectional view of the separating mechanism in the cartridge according to the first embodiment in a state where the lever is at a third lever position.
Figure 9B:
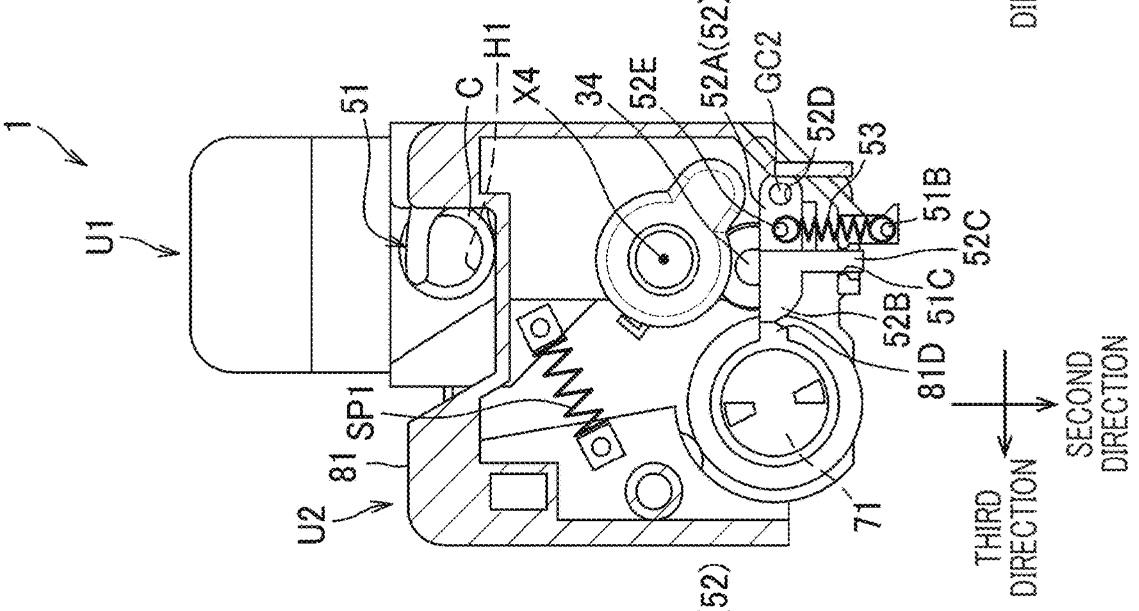
FIG. 9B is a cross-sectional view of the separating mechanism in the cartridge according to the first embodiment in a state where the lever is at a second lever position.
Figure 9A:
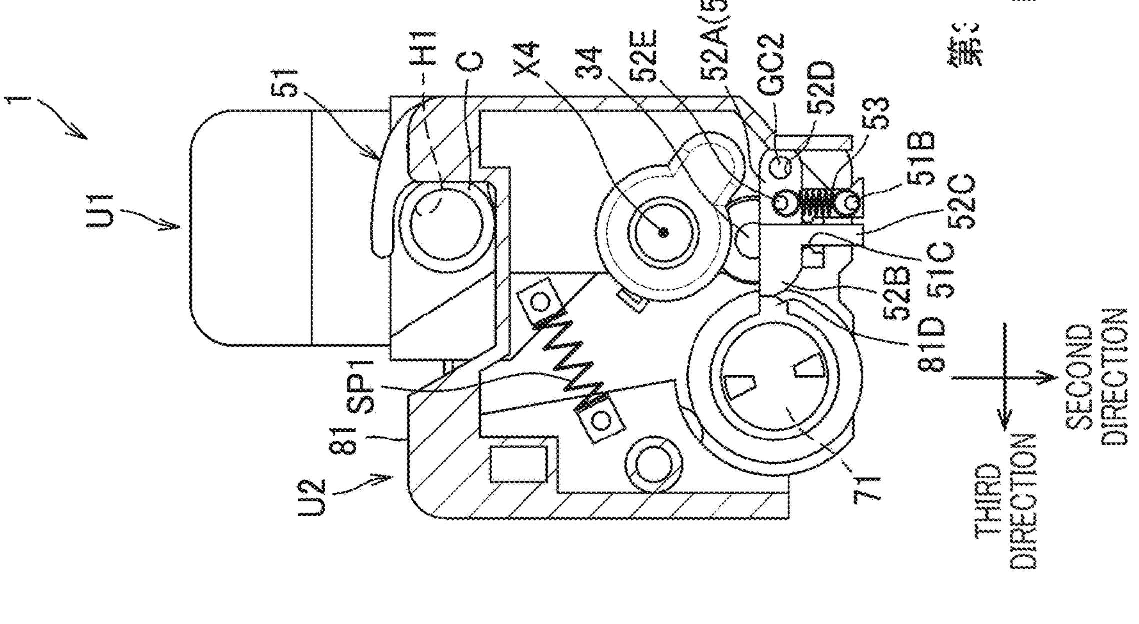
FIG. 9A is a cross-sectional view of a separating mechanism in the cartridge according to the first embodiment in a state where a lever is at a first lever position.

The lever 51 is movable in the second direction between a first lever position illustrated in FIG. 9A and a second lever position illustrated in FIG. 9B. The lever 51 is also pivotally movable between the second lever position illustrated in FIG. 9B and a third lever position illustrated in FIG. 9C.

The locking member 52 is configured to lock the developing roller 34 at the second position. As illustrated in FIG. 6, the locking member 52 includes a first part 52A, a second part 52B, and a third part 52C.

The first part 52A has a hole 52D and a protrusion 52E. The protrusion GC2 of the gear cover GC is received in the hole 52D. The protrusion GC2 pivotally movably supports the locking member 52. The locking member 52 is pivotally movable between a locking position illustrated in FIGS. 9A and 9B and an unlocking position illustrated in FIG. 9C. The locking member 62 is restricted from pivoting counterclockwise from the locking position in FIGS. 9A and 9B (i.e., in a clockwise direction opposite a pivoting direction from the locking position to the unlocking position in FIGS. 9A and 9B).

The tension coil spring 53 has one end portion hooked with the protrusion 51B of the lever 51, and another end portion hooked with the protrusion 52E of the locking member 52.

The second part 52B is positioned opposite the hole 52D with respect to the protrusion 52E. When the locking member 52 is at the locking position, a tip end of the second part 52B is engaged with the protrusion 81D of the first side cover 81. When the locking member 52 is at the unlocking position, the tip end of the second part 52B is disengaged from the protrusion 81D.

As illustrated in FIG. 6, the third part 52C extends from a boundary between the first part 52A and the second part 52B. The third part 52C is received in the recess 51C of the lever 51. As illustrated in FIG. 9A, when the locking member 52 is at the locking position, the first part 52A and the second part 52B extend in the third direction. When the locking member 52 is at the locking position, the third part 52C extends in the second direction toward the one side, i.e., in a direction away from the fourth axis X4 in the second direction.

Figure 10A:
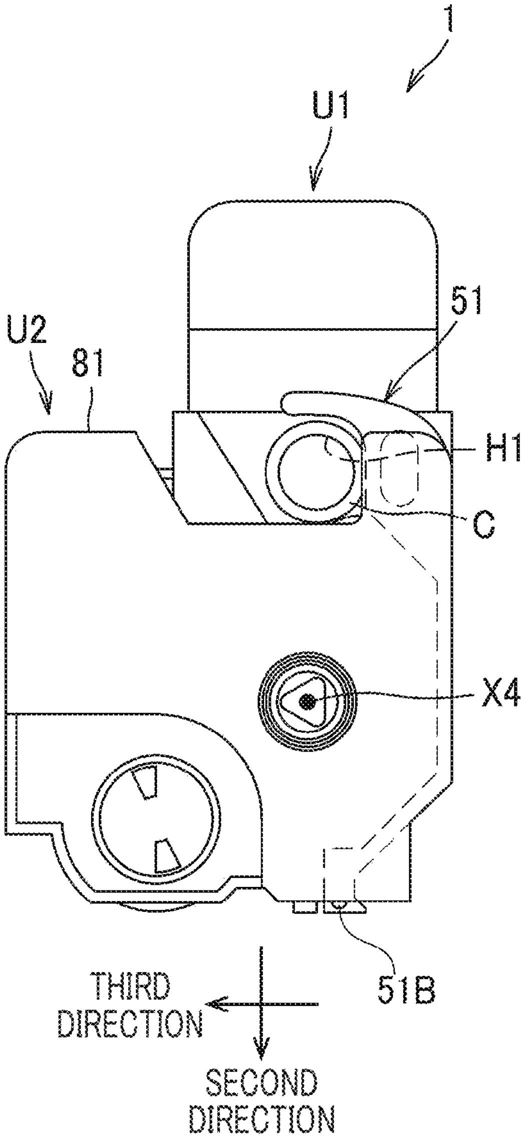
FIG. 10A is a side view of the cartridge according to the first embodiment as viewed from the one side in the first direction in the state where the lever is at the first lever position.

FIGS. 9A and 10A illustrate the cartridge 1 that is detached from the main housing of the image forming apparatus. Specifically, the image forming apparatus includes the main housing, and a drawer that is movable relative to the main housing. The cartridge 1 is attachable to and detachable from the drawer.

As illustrated in FIG. 9A, in a state where the cartridge 1 is detached from the main housing, the lever 51 is at the first lever position, the locking member 52 is at the locking position, and the developing roller 34 is at the second position. As illustrated in FIG. 10A, in a state where the lever 51 is at the first lever position, a part of the lever 51 protrudes in the second direction toward the other side (upward in FIG. 10A) from the first side cover 81. At this time, the lever 51 at the first lever position is not overlapped with the first opening H1 when viewed in the first direction.

Figure 10B:
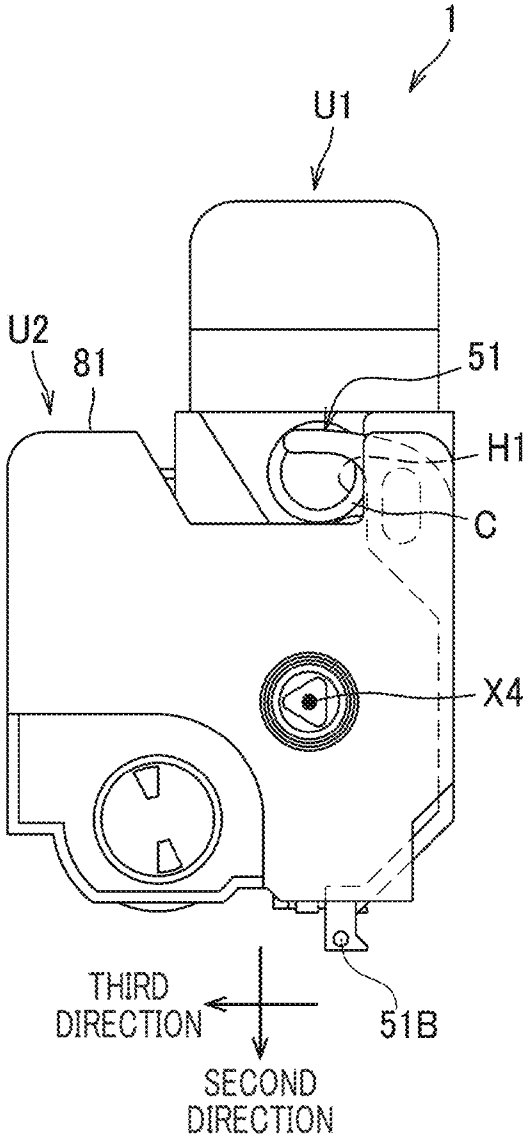
FIG. 10B is a side view of the cartridge according to the first embodiment as viewed from the one side in the first direction in the state where the lever is at the second lever position.

FIGS. 9B and 10B illustrates the cartridge 1 in a state where the cartridge 1 is attached to the main housing through the drawer and the cartridge 1 is not involved in printing. In other words, FIGS. 9B and 10B illustrate the cartridge 1 in a state where the drawer having the cartridge 1 attached thereto has been moved to an inside of the main housing from an outside thereof. As the drawer moves from the outside to the inside of the main housing, the other end portion in the second direction of the lever 51 is brought into abutment with a part of the main housing, thereby moving the lever 51 from the first lever position to the second lever position.

As illustrated in FIG. 9B, in a state where the cartridge 1 is attached to the main housing and printing is not performed, the lever 51 is at the second lever position, the locking member 52 is at the locking position, and the developing roller 34 is at the second position.

As illustrated in FIG. 10B, when the lever 51 is at the second lever position, a part of the lever 51 protrudes from the first side cover 81 toward the one side in the second direction (downward in FIG. 10B). Specifically, one end portion of the lever 51 in the second direction (lower end of the lever 51) protrudes from the first side cover 81 toward the one side in the second direction by a protruding amount that is greater when the lever 51 is at the second lever position (depicted in FIG. 10B) than when the lever 51 is at the first lever position (illustrated in FIG. 10A). As illustrated in FIG. 9B, the tension coil spring 53 is in a more stretched state when the lever 51 is at the second lever position than when the lever 51 is at the first lever position.

When the lever 51 is at the second lever position, the lever 51 is overlapped with the first opening H1 as viewed in the first direction. When the lever 51 is at the second lever position, the lever 51 is overlapped with the cap C as viewed in the first direction.

FIG. 9C illustrates the cartridge 1 in a state where the cartridge 1 is attached to the main housing and printing is performed. The image forming apparatus includes a pressing member (not illustrated) which is configured to press the one end portion in the second direction of the lever 51 (i.e., the lower end of the lever 51 protruding from the first side cover 81 in the second direction) toward the one side and the other side in the third direction.

Upon receipt of a printing instruction, a control unit of the image forming apparatus activates the pressing member to allow the pressing member to press the one end portion in the second direction of the lever 51 toward the one side in the third direction (leftward in FIG. 9B). As a result, the lever 51 pivotally moves from the second lever position (FIG. 9B) to the third lever position (FIG. 9C).

When the lever 51 is at the third lever position, the lever 51 is overlapped with the first opening H1 as viewed in the first direction. When the lever 51 is at the third lever position, the lever 51 is overlapped with the cap C as viewed in the first direction.

That is, in the state where the cartridge 1 is detached from the main housing, the lever 51 is not overlapped with the first opening H1 when viewed in the first direction. On the other hand, in the state where the cartridge 1 is attached to the main housing, the lever 51 is overlapped with the first opening H1 when viewed in the first direction, regardless of whether the developing roller 34 is at the first position or at the second position.

In response to the movement of the lever 51 from the second lever position to the third lever position by the pressing member, the recess 51C of the lever 51 presses the third part 52C of the locking member 52 toward the one side in the third direction (leftward in FIG. 9B). In accordance with the movement of the third part 52C toward the one side in the third direction, the locking member 52 pivotally moves from the locking position (FIG. 9B) to the unlocking position (FIG. 9C) to disengage the tip end of the locking member 52 (the second part 52B) from the protrusion 81D.

As illustrated in FIG. 9C, upon disengagement of the tip end of the locking member 52 (the second part 52B) from the protrusion 81D, the developing unit U1 pivotally moves clockwise in FIG. 9C about the fourth axis X4 by the urging force of the compression coil spring SP1, thereby moving the developing roller 34 from the second position to the first position. In other words, the developing roller 34 comes into contact with the photosensitive drum 71.

For separating the developing roller 34 from the photosensitive drum 71, the control unit activates the pressing member to cause the pressing member to press the one end portion in the second direction of the lever 51 (lower end of the lever 51) toward the other side in the third direction (rightward in FIG. 9C). As a result, the lever 51 pivotally moves from the third lever position (FIG. 9C) to the second lever position (FIG. 9B).

In response to the movement of the lever 51 from the third lever position to the second lever position, the recess 51C of the lever 51 pushes the third part 52C of the locking member 52 toward the other side in the third direction (rightward in FIG. 9C), while the lever 51 pulls the locking member 52 toward the locking position through the tension coil spring 53. As a result, the locking member 52 pivotally moves from the unlocking position (FIG. 9C) to the locking position (FIG. 9B) to bring the tip end of the locking member 52 (the second part 52B) into engagement with the protrusion 81D.

While the locking member 52 pivotally moves from the unlocking position to the locking position, the locking member 52 pushes one end portion of the developing unit U1 in the second direction toward the other side in the third direction. As a result, the developing unit U1 pivotally moves counterclockwise in FIG. 9C about the fourth axis X4 against the urging force of the compression coil spring SP1, thereby moving the developing roller 34 from the first position to the second position.

In accordance with the movement of the drawer from the inside to the outside of the main housing, the one end portion in the second direction of the lever 51 abuts on the part of the main housing to move the lever 51 from the second lever position (FIG. 9B) to the first lever position (FIG. 9A).

According to the present embodiment described above, the following technical advantages can be obtained.

As illustrated in FIG. 6, the cap C for blocking the first opening H1 can be detachably attached to the casing 10. With this structure, simply removing the cap C from the first opening H1 enables refilling of toner into the casing 10 after the toner in the casing 10 is used up. Therefore, this configuration can realize easy recycling of the cartridge 1 without requiring disassembling of the casing 10.

Further, since the fourth opening H4 through which the first opening H1 is exposed to the outside is provided on the first bearing 41, toner can be replenished through the exposed first opening H1 without removal of the first bearing 41 from the casing 10.

Still further, since the fifth opening H5 through which the first opening H1 is exposed to the outside is provided in the first side cover 81, toner can be replenished through the exposed first opening H1 without removal of the first side cover 81 from the drum housing 73.

As illustrated in FIG. 9A, when the lever 51 is at the first lever position, the first opening H1 is not overlapped with the lever 51 as viewed in the first direction. Accordingly, the lever 51 does not hamper refilling of toner through the first opening H1.

As illustrated in FIG. 1, since the third storage bag 23 is accommodated in the handle 12, the internal space of the handle 12 can be effectively utilized.

Incidentally, providing a storage bag inside the handle 12 may contribute to effective utilization of the internal space of the handle 12, even without the first opening H1 and the cap C.

Second Embodiment

Next, a second embodiment of the present disclosure will be described in detail with reference to FIGS. 11 and 12, wherein like parts and components are designated by the same reference numerals as those of the first embodiment shown in FIGS. 1 through 10 to avoid duplicating description.

Figure 11:
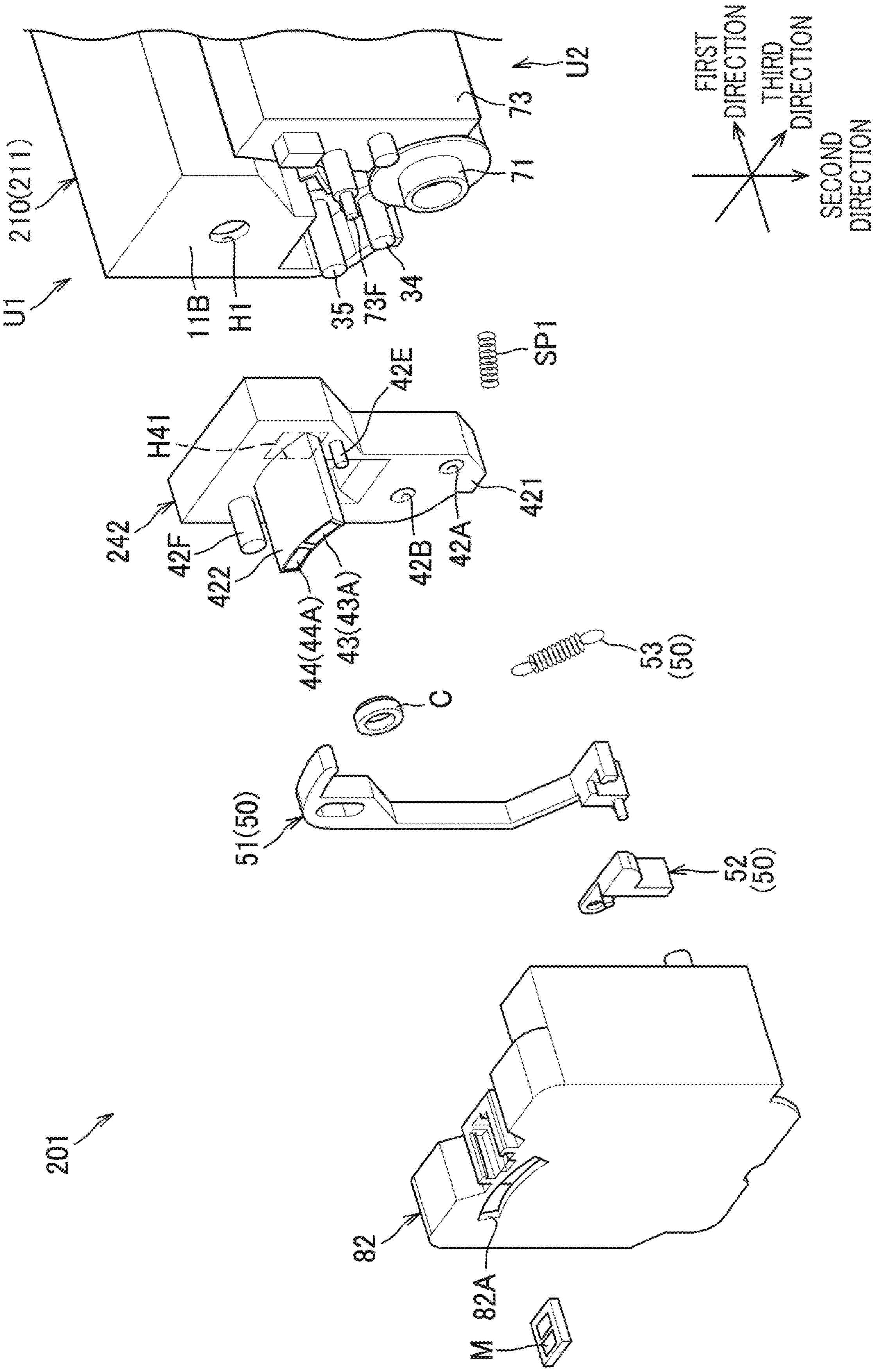
FIG. 11 is an exploded perspective view illustrating a structure of another end portion in the first direction of a cartridge according to a second embodiment.

FIG. 11 illustrates a cartridge 201 according to the second embodiment. In the cartridge 201 according to the second embodiment, the positions of the first opening H1 and the cap C are different from those in the first embodiment. Specifically, the cartridge 201 of the second embodiment includes a casing 210 in place of the casing 10 of the first embodiment. The casing 210 includes a casing body 211 (corresponding to the casing body 11) and the handle 12. In the second embodiment, the first opening H1 is positioned in the second side wall 11B of the casing 210 (casing body 211), and the cap C is fitted with the first opening H1 of the second side wall 11B.

Figure 12:
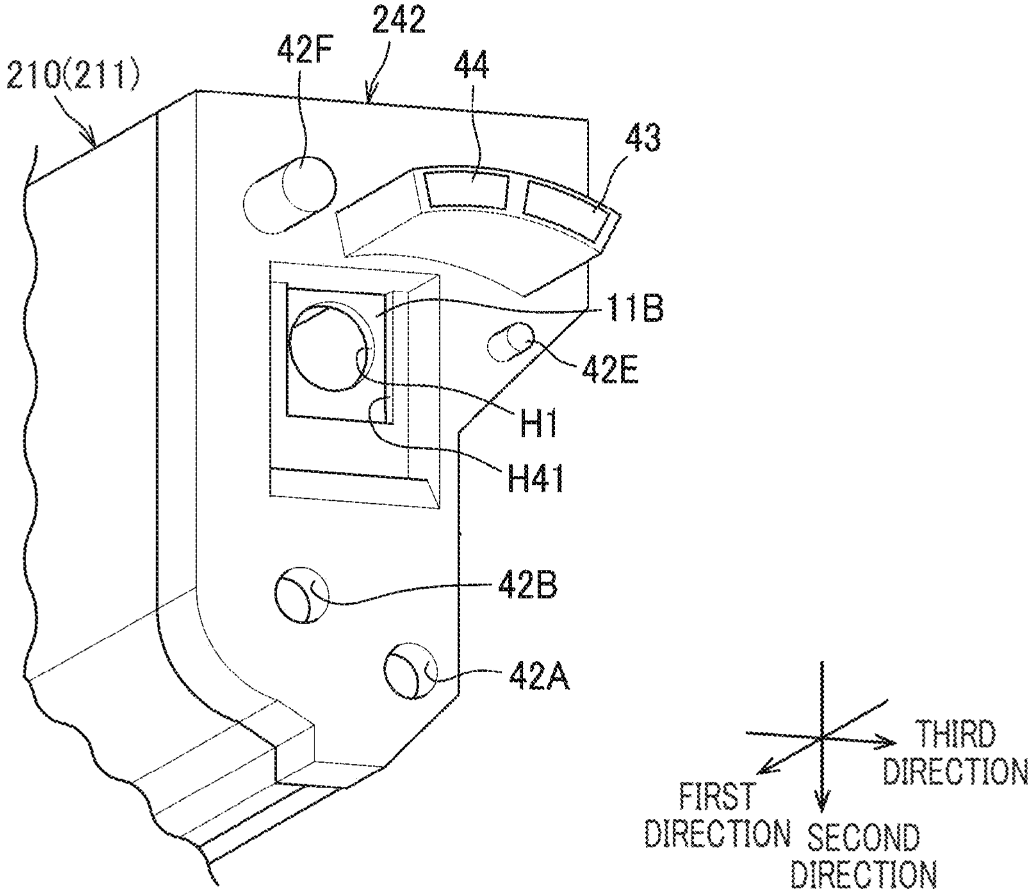
FIG. 12 is a perspective view illustrating a state where a second bearing is attached to a casing in the cartridge according to the second embodiment.

Further, as illustrated in FIG. 12, the cartridge 201 according to the second embodiment includes a second bearing 242, in place of the second bearing 42 of the first embodiment. The second bearing 242 has a fourth opening H41 through which the first opening H1 is exposed to the outside. As illustrated in FIG. 11, the fourth opening H41 is covered by the second side cover 82.

According to the second embodiment, since the fourth opening H41 is covered with the second side cover 82, user's accidental removal of the cap C can be restricted. Further, for replenishing toner, the cap C can be removed from the first opening H1 after the second side cover 82 and the separation mechanism 50 are removed from the casing 210. Refiling of toner into the casing 210 can be thus performed through the first opening H1 after removing the cap C.

Third Embodiment

Next, a cartridge 301 according to a third embodiment of the present disclosure will be described in detail with reference to FIGS. 13 and 14, wherein like parts and components are designated by the same reference numerals as those of the first embodiment shown in FIGS. 1 through 10 to avoid duplicating description.

Figure 13:
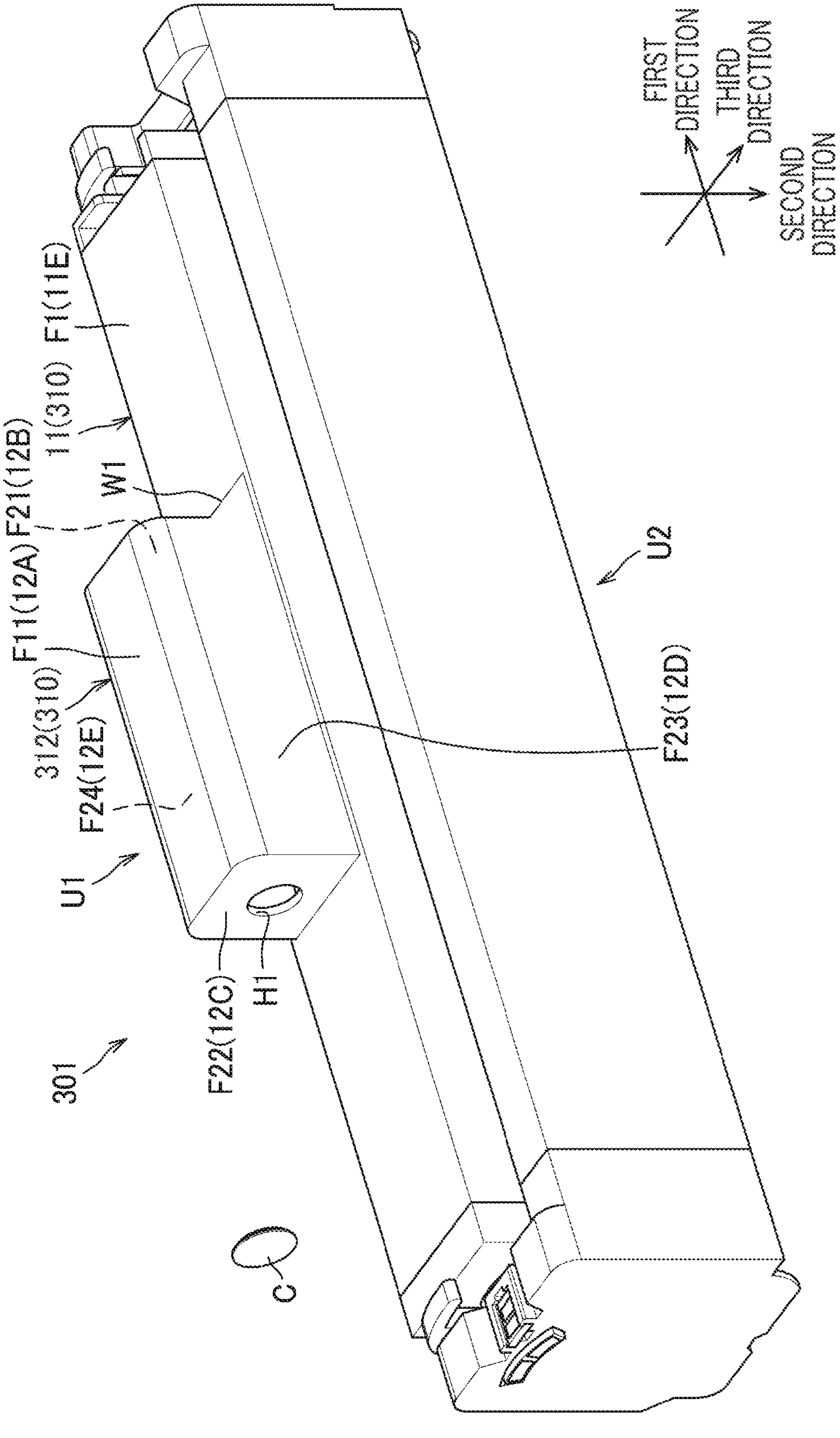
FIG. 13 is a perspective view of a cartridge according to a third embodiment.
Figure 14:
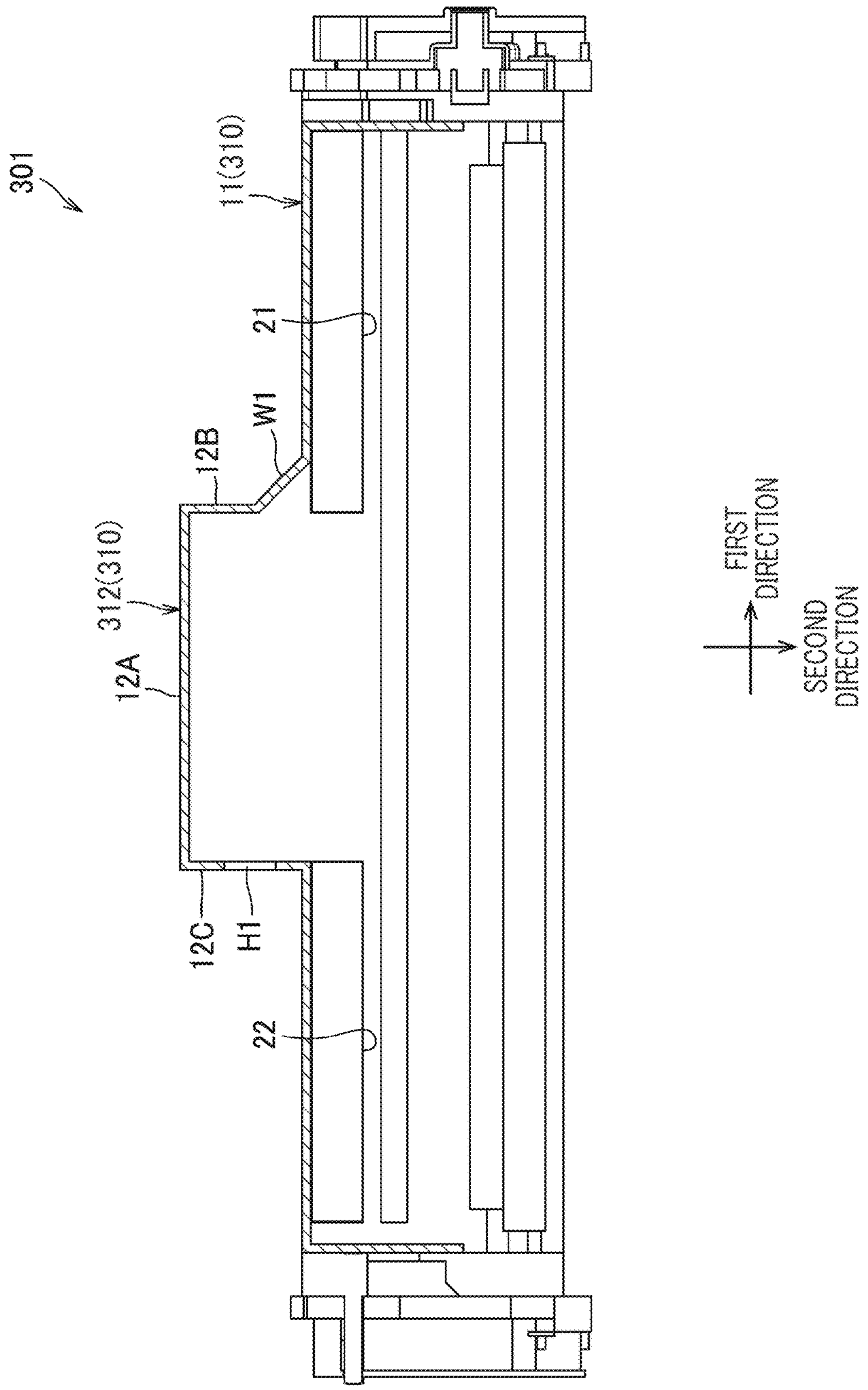
FIG. 14 is a cross-sectional view illustrating a positional relationship between a first opening and a sloping wall in the cartridge according to the third embodiment.

As illustrated in FIG. 13, in the cartridge 301 according to the third embodiment, the positions of the first opening H1 and the cap C are different from those in the first embodiment. Specifically, the cartridge 301 of the third embodiment includes a casing 310 corresponding to the casing 10 of the first embodiment. The casing 310 includes the casing body 11 and a handle 312 in place of the handle 12. In the third embodiment, the handle 312 has the first opening H1. The cap C is fitted with the first opening H1 of the handle 312.

Specifically, the handle 312 has a first handle surface F11 and four second handle surfaces F21, F22, F23, and F24. The first handle surface F11 is positioned apart from the first surface F1 in a direction crossing the first surface F1. Specifically, the first handle surface F11 is positioned apart from the first surface F1 in the second direction.

The second handle surfaces F21, F22, F23, and F24 connect the first handle surface F11 to the first surface F1. The second handle surface F21 is positioned at one end of the first handle surface F11 in the first direction. The second handle surface F22 is positioned at another end of the first handle surface F11 in the first direction.

The second handle surface F23 is positioned at one end of the first handle surface F11 in the third direction. The second handle surface F24 is positioned at another end of the first handle surface F11 in the third direction.

The handle 312 includes five walls 12A, 12B, 12C, 12D, and 12E. The wall 12A has the first handle surface F11. The wall 12B has the second handle surface F21. The wall 12C has the second handle surface F22. The wall 12D has the second handle surface F23. The wall 12E has the second handle surface F24.

The first opening H1 is positioned in the wall 12C. As illustrated in FIG. 14, the cartridge 301 does not include a storage bag corresponding to the third storage bag 23 of the first embodiment. The cartridge 301 includes the first storage bag 21 and the second storage bag 22 as in the first embodiment. In other words, no storage bag is accommodated in the handle 312.

In the cartridge 301 according to the third embodiment, the first opening H1 is formed at such a position that toner replenished through the first opening H1 can be accommodated in a region in the casing 310 where neither the first storage bag 21 nor the second storage bag 22 is present (i.e., in a region that is not occupied by the first storage bag 21 nor the second storage bag 22). In the third embodiment, the first opening H1 faces neither the first storage bag 21 nor the second storage bag 22.

The handle 312 also has a sloping wall W1. The sloping wall W1 faces the first opening H1 in the first direction. Specifically, the sloping wall W1 has a portion that faces a part of the first opening H1 in the first direction.

The sloping wall W1 slopes relative to a vertical direction in a state where the cartridge 301 is in such a posture that the first opening H1 faces in the vertical direction. More specifically, in a state where the cartridge 301 is held such that the first opening H1 faces upward and the sloping wall W1 faces downward in the vertical direction, the sloping wall W1 extends diagonally downward as extending away from the first opening H1 in a direction orthogonal to the vertical direction. In other words, the sloping wall W1 extends downward as approaching the wall 11E (first surface F1) of the casing body 11 in the state where the cartridge 301 is held such that the first opening H1 faces upward and the sloping wall W1 faces downward in the vertical direction.

In the third embodiment, for refilling the casing body 11 with toner, the cartridge 301 is held such that one end of the cartridge 301 in the first direction faces downward to allow the first opening H1 facing upward, and then, toner is supplied into the handle 312 through the first opening H1. The toner supplied into the handle 312 through the first opening H1 moves downward due to gravity, and falls onto the sloping wall W1. The toner on the sloping wall W1 moves toward the casing body 11 due to gravity.

In this way, the toner is guided into a deeper portion of the casing body 11 by the sloping wall W1. This construction can suppress stagnation of the toner on the wall(s) of the casing 310 facing the first opening H1, thereby facilitating refiling of toner into the casing body 11.

Fourth Embodiment

Next, a cartridge 401 according to a fourth embodiment of the present disclosure will be described in detail with reference to FIG. 15, wherein like parts and components are designated by the same reference numerals as those of the third embodiment shown in FIGS. 13 and 14 to avoid duplicating description.

Figure 15:
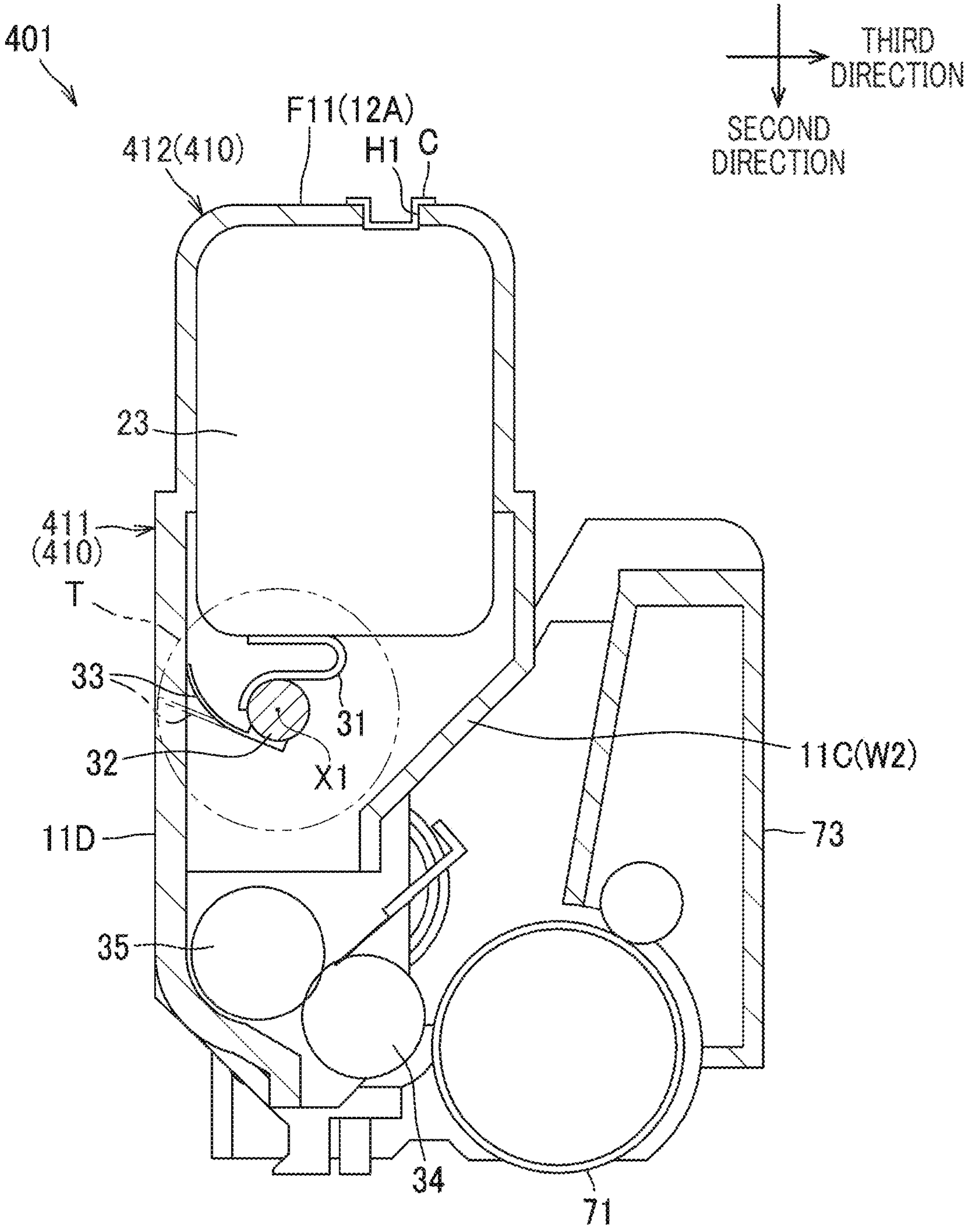
FIG. 15 is a cross-sectional view of a cartridge according to a fourth embodiment.

In the cartridge 401 according to the fourth embodiment illustrated in FIG. 15, the positions of the first opening H1 and the cap C are different from those in the third embodiment. Specifically, the cartridge 401 of the fourth embodiment includes a casing 410 corresponding to the casing 310 of the third embodiment. The casing 410 includes a casing body 411 (corresponding to the casing body 11) and a handle 412 in place of the handle 312. In the fourth embodiment, the first opening H1 is positioned in the wall 12A (having the first handle surface F11) of the handle 412.

The first opening H1 is at such a position that the first opening H1 does not overlap a trajectory T defined by the rotation of the sheet 33 when viewed in the first direction. The cap C is fitted with the first opening H1 positioned in the first handle surface F11 of the handle 412.

Further, the third side wall 11C of the casing body 411 includes a sloping wall W2. The sloping wall W2 faces the first opening H1 in the second direction. The sloping wall W2 is inclined relative to the vertical direction in a state where the first opening H1 faces in the vertical direction.

Since the first opening H1 and the sloping wall W2 face each other in the second direction in the fourth embodiment, the structure of the fourth embodiment can exhibit the same advantageous effects as the third embodiment. Further, in the fourth embodiment, since the first opening H1 does not overlap the trajectory T of the rotation of the sheet 33 when viewed in the first direction, the sheet 33 does not disturb user's refilling of toner through the first opening H1.

Fifth Embodiment

Next, a cartridge 501 according to a fifth embodiment of the present disclosure will be described in detail with reference to FIGS. 16, 17A, and 17B wherein like parts and components are designated by the same reference numerals as those of the first embodiment shown in FIGS. 1 through 10 to avoid duplicating description.

Figure 16:
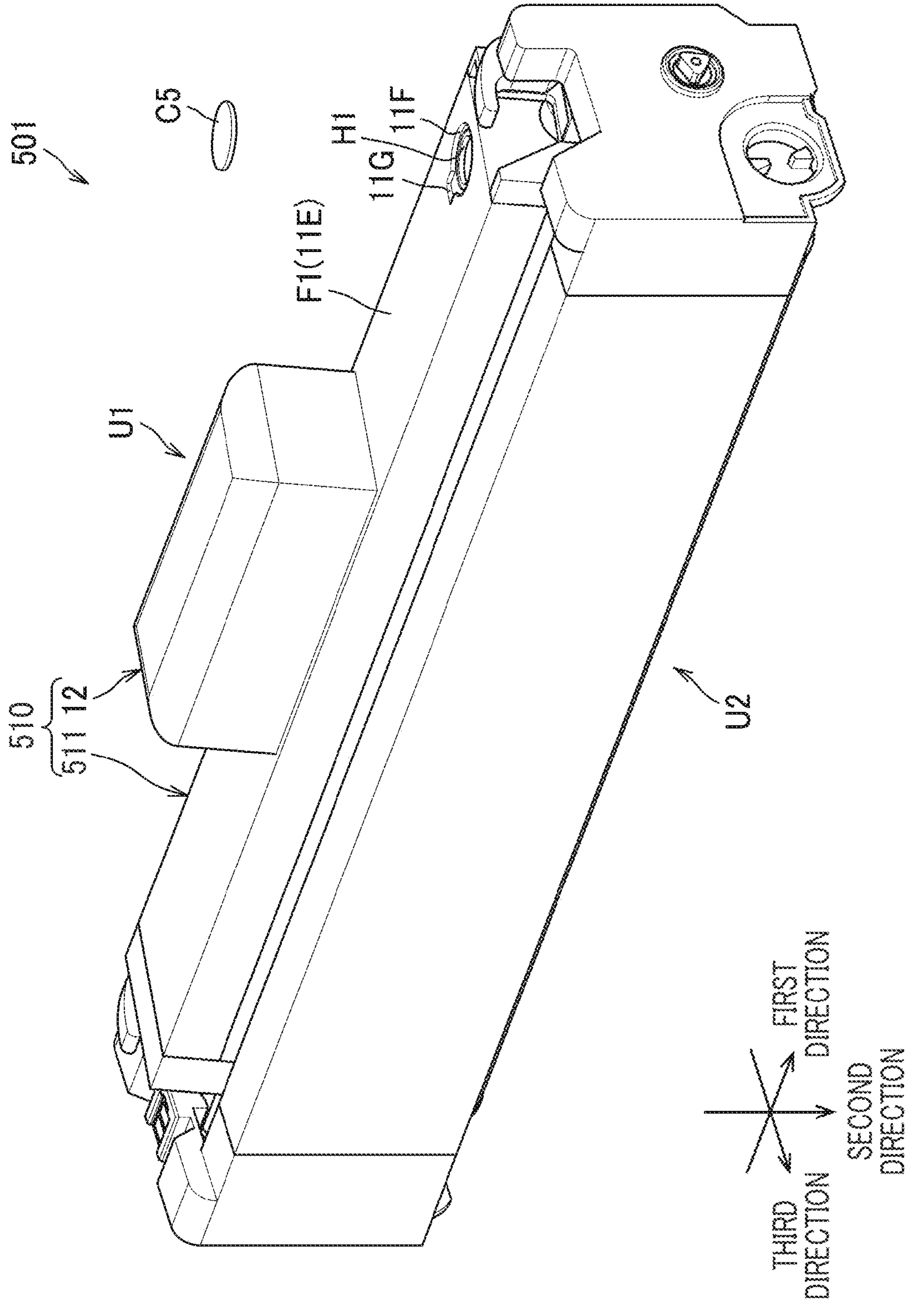
FIG. 16 is a perspective view of a cartridge according to a fifth embodiment.

As illustrated in FIG. 16, in the cartridge 501 according to the fifth embodiment, the positions of the first opening H1 and a cap C5 (corresponding to the cap C of the first embodiment) are different from those of the first embodiment. Specifically, the cartridge 501 according to the fifth embodiment includes a casing 510 corresponding to the casing 10. The casing 510 includes a casing body 511 (corresponding to the casing body 11) and the handle 12. In the cartridge 501 according to the fifth embodiment, a storage bag may be provided in the internal space of the handle 12, or in an internal space of the casing body 511.

In the fifth embodiment, the first opening H1 is positioned in the wall 11E having the first surface F1 of the casing body 511. The first opening H1 is positioned apart from the handle 12 in the first direction. The cap C5 is a circular disk.

Figure 17A:
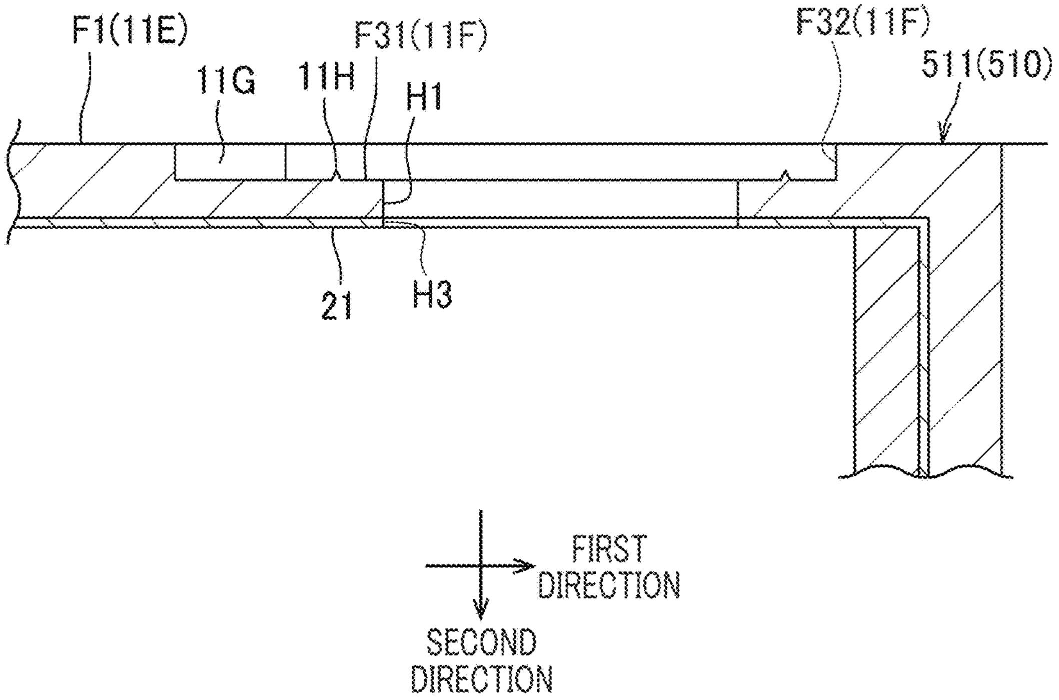
FIG. 17A is an enlarged cross-sectional view illustrating a depression and a groove in the cartridge according to the fifth embodiment.

As illustrated in FIGS. 16 and 17A, the casing body 511 has the first surface F1, a depression 11F, a groove 11G, and a protrusion 11H. The depression 11F is recessed from the first surface F1 in the second direction, and is circular when viewed in the second direction (i.e., when viewed in a direction orthogonal to the first surface F1). The depression 11F has a bottom surface F31 and a connecting surface F32.

The bottom surface F31 is apart from the first surface F1 in the second direction. The connecting surface F32 connects the first surface F1 to the bottom surface F31.

The groove 11G is recessed from the first surface F1 in the second direction. The groove 11G extends in the first direction. The groove 11G has one end in the first direction connected to the depression 11F to communicate therewith. The groove 11G has a width in the third direction that is smaller than a width (diameter) of the depression 11F in the third direction.

The first opening H1 is positioned in the bottom surface F31. The third opening H3 of the first storage bag 21 is positioned in alignment with the first opening H1.

The protrusion 11H is used for fuse-bonding the cap C5 to the bottom surface F31. The protrusion 11H protrudes from the bottom surface F31. The protrusion 11H has an annular shape to surround the first opening 11H. The protrusion 11H is tapered to have a pointed tip end. The protrusion 11H is apart from the connecting surface F32. The protrusion 11H is also apart from the first opening H1. The protrusion 11H protrudes from the bottom surface F31 to have a protruding amount that is smaller than a depth of the depression 11F. In other words, a distance from the bottom surface F31 to the tip end of the protrusion 11H is smaller than a distance from the bottom surface F31 to the first surface F1 in the second direction.

Figure 17B:
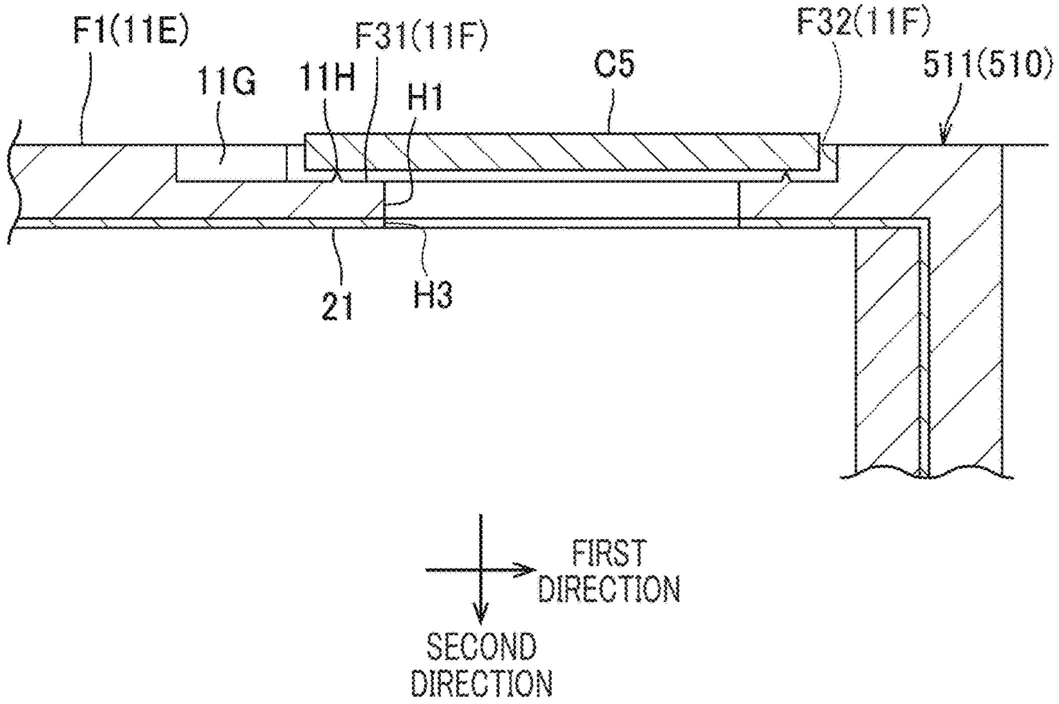
FIG. 17B is an enlarged cross-sectional view illustrating a state where a cap is attached to the depression in the cartridge according to the fifth embodiment.

As illustrated in FIG. 17B, the cap C5 is fixed to the bottom surface F31 by fuse-bonding to the protrusion 11H. A fusion-bonding surface between the cap C5 and the protrusion 11H provides an area that is equal to or smaller than a prescribed value. With this configuration, the cap C5 welded to the protrusion 11H can be made detachable from the casing 510. Here, "the cap C5 is detachable from the casing 510" means that the area of the fusion-bonding surface between the cap C5 and the protrusion 11H is small enough to allow the cap C5 to be removed from the casing 510 without any damage to a remaining part of the casing 510 other than the protrusion 11H.

In a state where the cap C5 is fixed to the bottom surface F31, the cap C5 is separated away from the connecting surface F32, while a minute gap is formed between the cap C5 and the bottom surface F31.

According to the fifth embodiment, the following technical advantages can be obtained.

Since the cap C5 is fixed to the bottom surface F31 of the depression 11F, the cap C5 can protrude from the first surface F1 by a smaller amount than otherwise, enabling the cartridge 501 to be made more compact.

To this effect, the first to third storage bags 21, 22, 23 (and the seal 31) may not be provided inside the casing 510 of the fifth embodiment. In this case, the shaft 32 may function only as the shaft of the agitator.

Further, the cap C5 is separated from the connecting surface F32 and the minute gap is formed between the cap C5 and the bottom surface F31. With this structure, a jig can be inserted in a gap between the cap C5 and the connecting surface F32 and the minute gap between the cap C5 and the bottom surface F31 to remove the cap C5 fixed to the bottom surface F31 of the depression 11F. Accordingly, the cap C5 can be easily detached from the casing 510.

Further, since the groove 11G is in communication with the depression 11F, the insertion of the jig into the gap between the cap C5 and the bottom surface F31 can be easily performed through the groove 11G to realize detachment of the cap C5 fixed to the bottom surface F31 of the depression 11F. As such, the cap C5 can be easily detached from the casing 510.

Incidentally, in place of the fuse-bonding, an adhesive agent may be used for fixing the cap C5 to the bottom surface F31. When the cap C5 is fixed to the bottom surface F31 by adhesive bonding, the cap C5 may be separated from the connection surface F32, or from the bottom surface F31.

In this case, "the cap C5 is detachable from the casing 510" means that an adhesive-bonded area between the cap C5 and the bottom surface F31 is small enough to realize removal of the cap C5 from the casing 510 without any damage to the casing 510.

Sixth Embodiment

Figure 20:
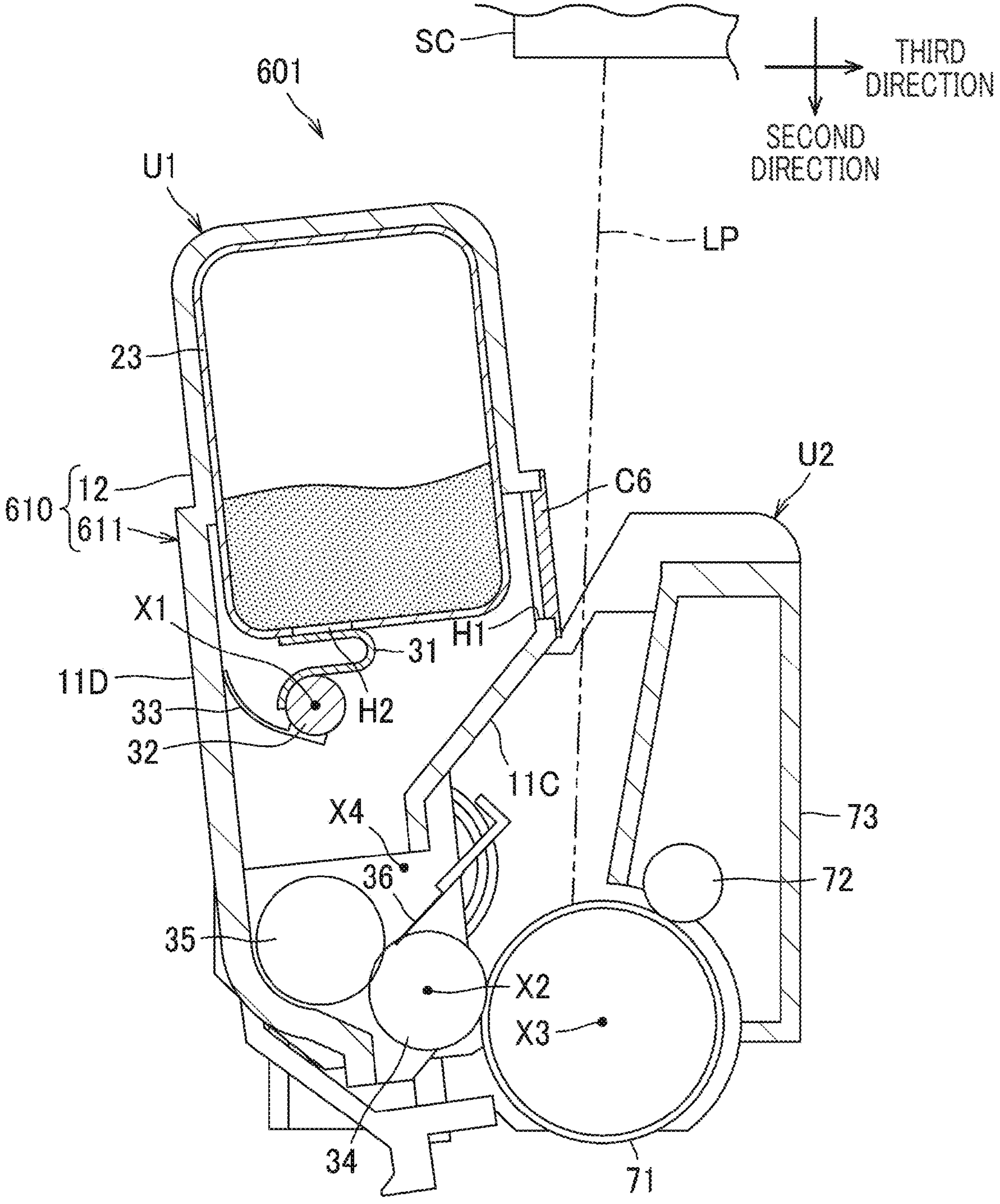
FIG. 20 is a cross-sectional view of the cartridge according to the sixth embodiment when the developing roller is at the first position.

Next, a cartridge 601 according to a sixth embodiment of the present disclosure will be described in detail with reference to FIGS. 18, through 20, wherein like parts and components are designated by the same reference numerals as those of the first embodiment shown in FIGS. 1 through 10 to avoid duplicating description.

Figure 18:
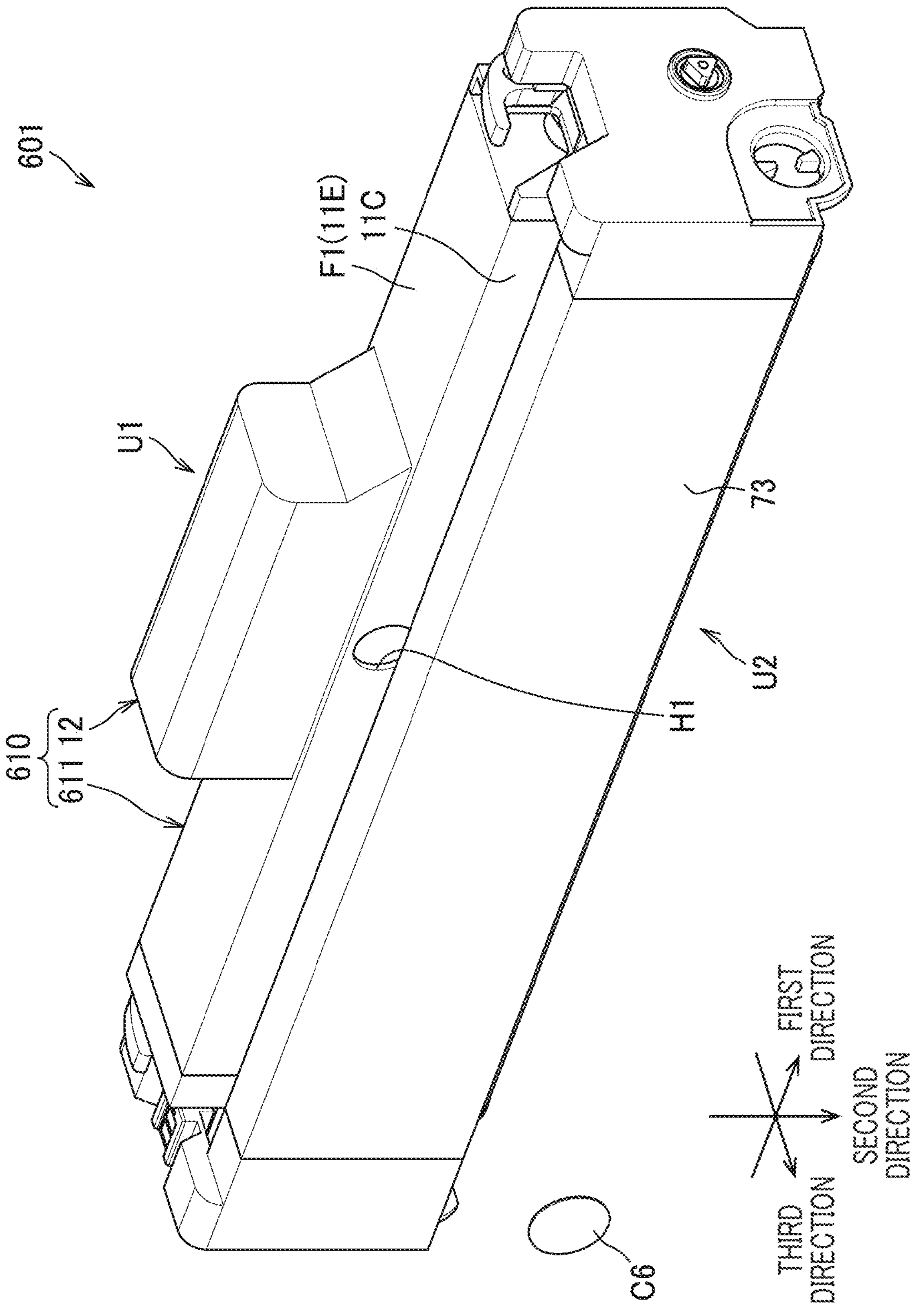
FIG. 18 is a perspective view of a cartridge according to a sixth embodiment.

As illustrated in FIG. 18, in the cartridge 601 according to the sixth embodiment, the positions of the first opening H1 and a cap C6 (corresponding to the cap C of the first embodiment) are different from those in the first embodiment. Specifically, the cartridge 601 according to the sixth embodiment includes a casing 610 corresponding to the casing 10. The casing 610 includes a casing body 611 (corresponding to the casing body 11) and the handle 12. In the sixth embodiment, the first opening H1 is positioned in the third side wall 11C of the casing body 611.

The first opening H1 has a part which does not overlap the drum housing 73 as viewed in the third direction. Specifically, as illustrated in FIGS. 19 and 20, a part of the first opening H1 is not overlapped with the drum housing 73 when viewed in the third direction, regardless of whether the developing roller 34 is at the first position or at the second position.

Figure 19:
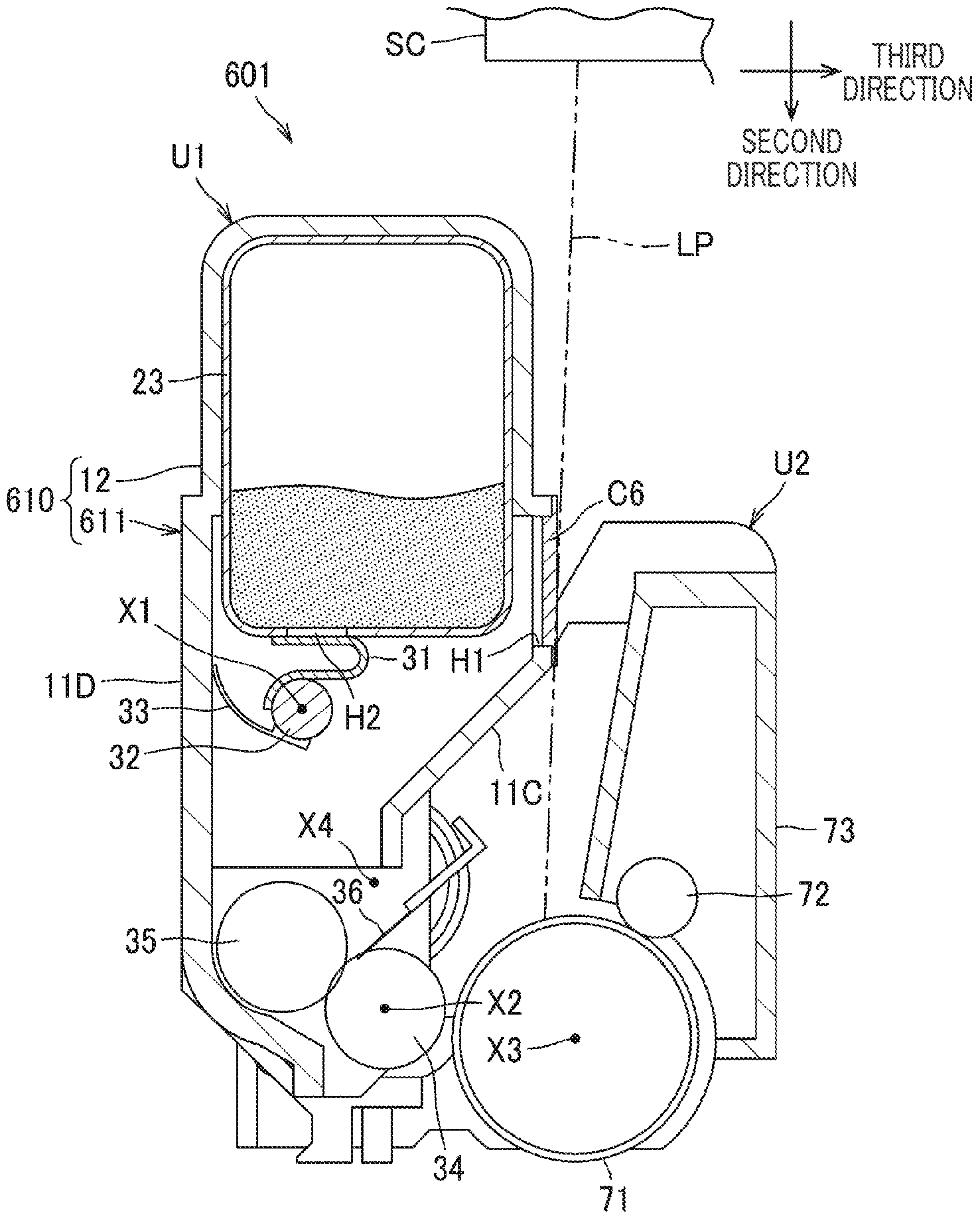
FIG. 19 is a cross-sectional view of the cartridge according to the sixth embodiment when the developing roller is at the second position.

The part of the first opening H1 that does not overlap the drum housing 73 as viewed in the third direction has an area that is greater when the developing roller 34 is at the first position (FIG. 20) than when the developing roller 34 is at the second position (FIG. 19). The first opening H1 is positioned farther away from the drum housing 73 when the developing roller 34 is at the first position than when the developing roller 34 is at the second position.

The cap C6 is fitted with the first opening H1. As illustrated in FIG. 20, in a state where the cartridge 601 is attached to the image forming apparatus and the developing roller 34 is at the first position, the cap C6 is positioned away from a path LP of the light irradiated from the exposure unit SC to the photosensitive drum 71. As illustrated in FIG. 19, in a state where the cartridge 601 is attached to the image forming apparatus and the developing roller 34 is at the second position, the cap C6 is positioned on the path LP.

According to the sixth embodiment, the following technical advantages can be obtained.

Since the first opening H1 has the part that does not overlap the drum housing 73 when viewed in the third direction, refilling of toner can be performed with ease through the first opening H1.

When the developing roller 34 is at the first position, the area of the part of the first opening H1 that does not overlap the drum housing 73 is greater and the first opening H1 is positioned farther away from the drum housing 73, as compared to when the developing roller 34 is at the second position. With this arrangement, refilling of toner can be performed more easily by positioning the developing roller 34 at the first position.

The cap C6 is positioned on the path LP of the light coming from the exposure unit SC when the developing roller 34 is at the second position, as illustrated in FIG. 19. This configuration can effectively utilize a space required for the path LP of the light irradiated from the exposure unit SC.

To this effect, the first to third storage bags 21, 22, 23 (and the seal 31) may not be provided inside the casing 610 of the sixth embodiment. In this case, the shaft 32 may function only as the shaft of the agitator.

Incidentally, an entirety of the first opening H1 may be arranged so as not to overlap the drum housing 73 when viewed in the third direction.

Variations and Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

A first opening of the disclosure may be positioned in a fourth side wall of a casing of the disclosure (i.e., the fourth side wall 11D of the casing body 11 in the first embodiment).

The first opening of the disclosure may be arranged to be overlapped with a lever of the disclosure (lever 51 in the depicted embodiments) as viewed in the first direction when a developing roller of the disclosure (developing roller 34 in the depicted embodiments) is either at the first position or at the second position. Specifically, the first opening of the disclosure may be overlapped with the lever as viewed in the first direction when the developing roller is at one of the first position and the second position, whereas the first opening may not be overlapped with the lever as viewed in the first direction when the developing roller is at a remaining one of the first position and the second position.

The first opening of the disclosure may have various shapes other than the circular shape, such as oval and polygonal shapes. Similarly, a cap of the disclosure may also have various shapes other than the circular shape, such as oval and polygonal shapes, provided that the cap has the same shape as the first opening to cover the same.

The first opening of the disclosure may be overlapped with the lever as viewed in the first direction when the lever is at the first lever position.

A depression of the disclosure may be positioned in the handle, rather than in the casing body of the casing.

The number of storage bags accommodated in the casing may be one or not less than four.

A shaft of the disclosure (the shaft 32 in the depicted embodiments) may be provided as a shaft that does not constitute an agitator. That is, the shaft of the disclosure may be a shaft different from the shaft of the agitator.

The casing of the disclosure may not include a handle. Alternatively, the handle of the disclosure may be provided as a separate member from the casing body.

As a charger for charging a surface of a photosensitive drum, a charging device configured to perform corona discharge may be provided in place of the charging roller 72 of the depicted embodiments. Further, a drum housing of the disclosure may accommodate an entirety of the charger.

All the storage bags accommodated in the casing may be positioned in the handle.

A first casing surface of the disclosure may be any surface, as long as the first casing surface is a part of an outer surface of a casing body of the casing. Further, a casing outer surface of the disclosure may be any surface, as long as the casing outer surface is a part of an outer surface of the casing.

Unlike the first bearing 41 and second bearing 242, a bearing of the disclosure may not have a fourth opening (corresponding to the fourth opening H4, H41) for exposing the first opening therethrough. In this case, refiling of toner through the first opening may be performed by detaching the bearing from the casing.

Contrary to the first side cover 81, a side cover of the disclosure may not have a fifth opening (corresponding to the fifth opening H5) for exposing the first opening therethrough. In this case, refiling of toner through the first opening may be performed by detaching the side cover from the drum housing.

Parts and components employed in the above-described embodiments and modifications may be suitably selected and combined together.

Remarks

The cartridges 1, 201, 301, 401, 501, 601 are examples of a cartridge of the disclosure. The casings 10, 210, 310, 410, 510, 610 are examples of a casing of the cartridge. The first opening H1 is an example of a first opening of the casing. The first storage bag 21, the second storage bag 22, and the third storage bag 23 are examples of a storage bag. The second opening H2 is an example of a second opening of the storage bag. The seal 31 is an example of a seal. The shaft 32 is an example of a shaft. The caps C, C5, C6 are examples of a cap. The third opening H3 is an example of a third opening of the storage bag. The first surface F1 is an example of a first casing surface of the casing. The first surface F1 is also an example of a casing outer surface of the casing. The first side wall 11A, and the second side wall 11B are examples of a first side wall and a second side wall of the casing, respectively. The third side wall 11C and the fourth side wall 11D are examples of a third side wall and a fourth side wall of the casing, respectively. The handles 12, 312, 412 are examples of a handle of the casing. The first handle surface F11 is an example of a first handle surface of the handle, and the second handle surface F22 is an example of a second handle surface of the handle. The sloping wall W1 is an example of a sloping wall of the casing. The developing roller 34 is an example of a developing roller. The photosensitive drum 71 is an example of a photosensitive drum. The drum housing 73 is an example of a drum housing. The first bearing 41 and second bearing 242 are examples of a bearing. The fourth openings H4, H41 are examples of a fourth opening of the bearing. The developing electrode 43 is an example of a developing electrode. The lever 51 is an example of a lever. The sheet 33 is an example of a sheet attached to the shaft. The depression 11F is an example of a depression of the casing. The groove 11G is an example of a groove connected to the depression.

What is claimed is:

1. A cartridge comprising:

a casing having a first opening for replenishing toner therethrough;

a partition wall partitioning an internal space of the casing into a first storage space and a second storage space, the partition wall having a second opening through which an inside of the first storage space is in communication with an inside of the second storage space, the first storage space being configured to store toner therein, the second storage space being configured to receive the toner discharged from the first storage space through the second opening and store the received toner therein, the first opening being at such a position that the toner replenished through the first opening can be introduced in either one of the first storage space and the second storage space;

a seal for closing the second opening;

a shaft rotatable about a first axis extending in a first direction, the shaft being rotatable together with the seal such that the seal closing the second opening is peeled off to open the second opening; and a cap configured to close the first opening, the cap being attachable to and detachable from the casing.

2. The cartridge according to claim 1, wherein the casing includes:

a casing wall having a first casing surface; and a handle protruding from the first casing surface, and wherein the first opening is formed in the casing wall.

3. The cartridge according to claim 2, wherein the first opening is positioned away from the handle in the first direction.

4. The cartridge according to claim 2, further comprising a developing roller rotatable about a second axis extending in the first direction, the developing roller being positioned at one end of the casing in a second direction crossing the first direction, a part of the developing roller being positioned in the inside of the second storage space, wherein the handle is positioned at another end of the casing in the second direction.

5. The cartridge according to claim 1, wherein the casing includes:

a first casing surface; and a handle protruding from the first casing surface, and wherein the first opening is formed in the handle.

6. The cartridge according to claim 5, wherein the handle has:

a first handle surface positioned apart from the first casing surface in a direction crossing the first direction; and a second handle surface connecting the first casing surface to the first handle surface, and wherein the first opening is formed in a wall of the handle, the wall having the first handle surface.

7. The cartridge according to claim 5, wherein the handle has:

a first handle surface positioned apart from the first casing surface in a second direction crossing the first direction; and a second handle surface connecting the first casing surface to the first handle surface, and wherein the first opening is formed in a wall of the handle, the wall having the second handle surface.

8. The cartridge according to claim 7, wherein the casing further includes a sloping wall facing the first opening, the sloping wall being sloped relative to a vertical direction in a state where the first opening faces upward in the vertical direction.

9. The cartridge according to claim 8, wherein the handle includes the sloping wall.

10. The cartridge according to claim 1, wherein the casing includes:

a first side wall positioned at one end of the shaft in the first direction;

a second side wall positioned at another end of the shaft in the first direction;

a third side wall connecting the first side wall and the second side wall to each other; and a fourth side wall connecting the first side wall and the second side wall to each other, the fourth side wall being positioned opposite the third side wall with respect to the shaft, wherein the cartridge further comprises:

a developing roller attached to the casing and rotatable about a second axis extending in the first direction, a part of the developing roller being positioned in the inside of the second storage space; and a bearing rotatably supporting the developing roller, the bearing being attached to one of the first side wall and the second side wall, wherein the first opening is formed in the one of the first side wall and the second side wall, and wherein the bearing has a third opening through which the first opening is exposed.

11. The cartridge according to claim 10, further comprising a developing electrode electrically connected to the developing roller, wherein the bearing supports the developing electrode.

12. The cartridge according to claim 1, further comprising:

a developing roller attached to the casing and rotatable about a second axis extending in the first direction, a part of the developing roller being positioned in the inside of the second storage space;

a photosensitive drum rotatable about a third axis extending in the first direction; and a lever configured to move the developing roller between a first position and a second position relative to the photosensitive drum, the developing roller at the first position being in contact with the photosensitive drum, the developing roller at the second position being separated from the photosensitive drum, wherein the first opening is positioned to be overlapped with the lever as viewed in the first direction when the developing roller is either at the first position or at the second position.

13. The cartridge according to claim 12, wherein the first opening is overlapped with the lever as viewed in the first direction when the developing roller is at both the first position and the second position.

14. The cartridge according to claim 1, further comprising:

a developing roller attached to the casing and rotatable about a second axis extending in the first direction, a part of the developing roller being positioned in the inside of the second storage space;

a photosensitive drum rotatable about a third axis extending in the first direction; and a lever configured to move the developing roller between a first position and a second position relative to the photosensitive drum, the developing roller at the first position being in contact with the photosensitive drum, the developing roller at the second position being separated from the photosensitive drum, wherein the lever is movable between a first lever position and a second lever position, the lever at the first lever position being not overlapped with the first opening as viewed in the first direction, the lever at the second lever position being overlapped with the first opening as viewed in the first direction.

15. The cartridge according to claim 1, further comprising a sheet attached to the shaft, the sheet being rotatable together with the shaft within the casing to define a trajectory of rotation, wherein the first opening is positioned not to overlap the trajectory of rotation of the sheet as viewed in the first direction.

16. The cartridge according to claim 1, further comprising:

a developing roller rotatable about a second axis extending in the first direction, the developing roller being positioned at one end of the casing in a second direction crossing the first direction, a part of the developing roller being positioned in the inside of the second storage space;

a photosensitive drum rotatable about a third axis extending in the first direction;

a charger configured to charge a peripheral surface of the photosensitive drum; and a drum housing accommodating at least a part of the charger, wherein at least a part of the first opening is not overlapped with the drum housing as viewed in a third direction crossing both the first direction and the second direction.

17. The cartridge according to claim 1, further comprising:

a developing roller attached to the casing and rotatable about a second axis extending in the first direction, a part of the developing roller being positioned in the inside of the second storage space;

a photosensitive drum rotatable about a third axis extending in the first direction; and a lever configured to move the developing roller between a first position and a second position relative to the photosensitive drum, the developing roller at the first position being in contact with the photosensitive drum, the developing roller at the second position being separated from the photosensitive drum, wherein, in a state where the cartridge is attached to an image forming apparatus and the developing roller is at the first position, the cap is positioned away from a path of light irradiated from an exposure unit of the image forming apparatus, and wherein, in a state where the cartridge is attached to the image forming apparatus and the developing roller is at the second position, the cap is positioned on the path of the light irradiated from the exposure unit of the image forming apparatus.

18. The cartridge according to claim 17, further comprising:

a charger configured to charge a peripheral surface of the photosensitive drum; and a drum housing accommodating at least a part of the charger, wherein the casing includes:

a first side wall positioned at one end of the shaft in the first direction;

a second side wall positioned at another end of the shaft in the first direction;

a third side wall connecting the first side wall and the second side wall to each other, the third side wall facing the drum housing; and a fourth side wall connecting the first side wall and the second side wall to each other, the fourth side wall being positioned opposite the third side wall with respect to the shaft, and wherein the first opening is formed in the third side wall.

19. The cartridge according to claim 1, wherein the casing includes:

a casing wall having a casing outer surface; and a depression recessed from the casing outer surface, the depression having a bottom surface away from the casing outer surface, wherein the first opening is formed in the bottom surface of the depression, and wherein the cap is fixed to the bottom surface.

20. The cartridge according to claim 19, wherein the depression has a connecting surface connecting the bottom surface to the casing outer surface, wherein the cap is away from the connecting surface, and wherein the cap and the bottom surface define a gap therebetween.

* * * * *